United States Patent
Olsen et al.

(12) 
(10) Patent No.: US 9,430,106 B1
(45) Date of Patent: Aug. 30, 2016

(54) COORDINATED STYLUS HAPTIC ACTION

(71) Applicant: Amazon Technologies, Inc., Reno, NV (US)

(72) Inventors: Erik Jacob Olsen, Bellevue, WA (US); Robert Duane Rost, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 14/229,393

(22) Filed: Mar. 28, 2014

(51) Int. Cl.
*G06F 3/044* (2006.01)
*G06F 3/0354* (2013.01)

(52) U.S. Cl.
CPC .......... *G06F 3/044* (2013.01); *G06F 3/03545* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0204831 A1* | 10/2004 | Pochuev | ................ | H04L 67/16 701/408 |
| 2011/0190058 A1* | 8/2011 | Houston | ................ | A63F 13/06 463/36 |
| 2012/0127088 A1* | 5/2012 | Pance | ..................... | G06F 3/016 345/173 |
| 2013/0234972 A1* | 9/2013 | Bogsanyi | ............ | A63F 3/00075 345/173 |
| 2014/0253302 A1* | 9/2014 | Levesque | ................ | G06F 3/016 340/407.1 |

* cited by examiner

*Primary Examiner* — Gerald Johnson
*Assistant Examiner* — Robert Michaud
(74) *Attorney, Agent, or Firm* — Baker & Hostetler LLP

(57) ABSTRACT

A computing device can coordinate haptic action with a stylus. The computing device can receive an indication of the stylus from the stylus and determine that coordinated haptic action is associated with a user input. The computing device can send haptic instructions to the stylus where the haptic instructions are based at least in part on the coordinated haptic action. The stylus can activate its haptic actuator in response to receiving the haptic instruction. The computing device can also activate its haptic actuator based at least in part on the coordinated haptic action.

23 Claims, 15 Drawing Sheets

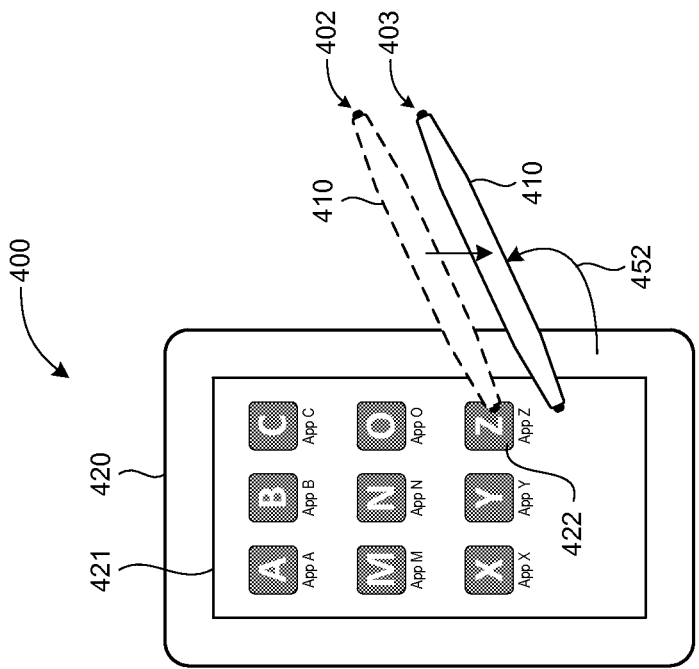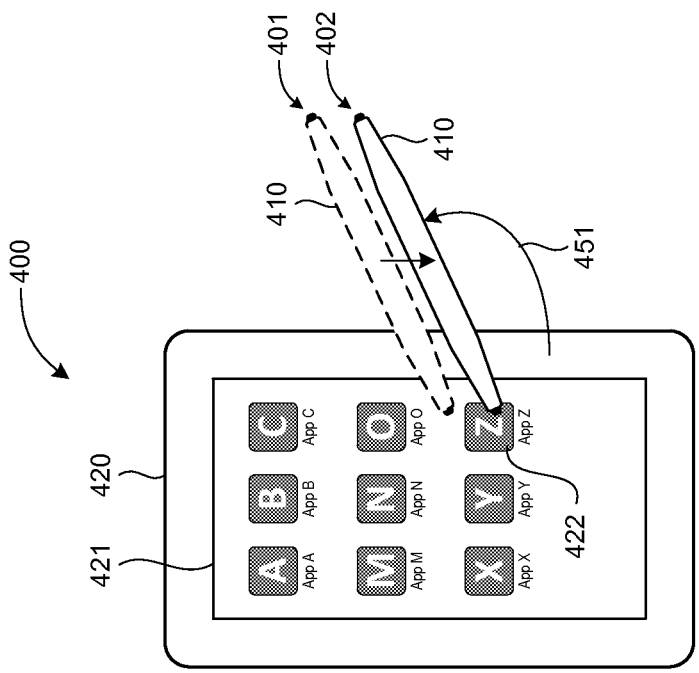

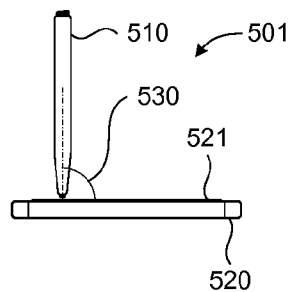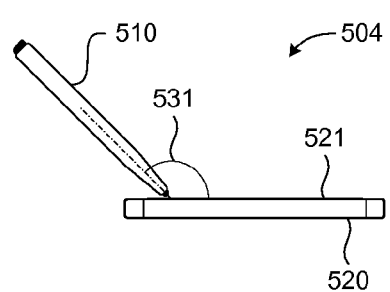
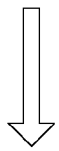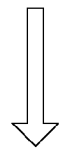
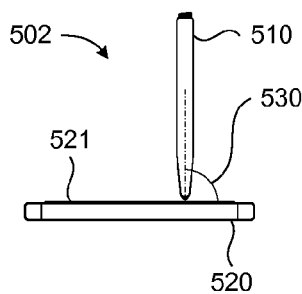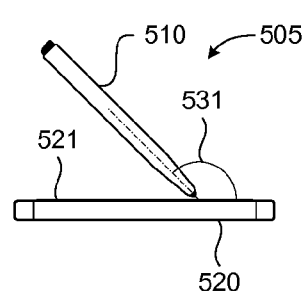
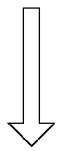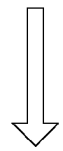
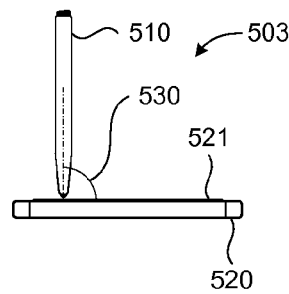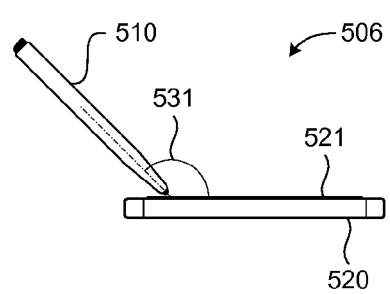
FIG. 5AFIG. 5B

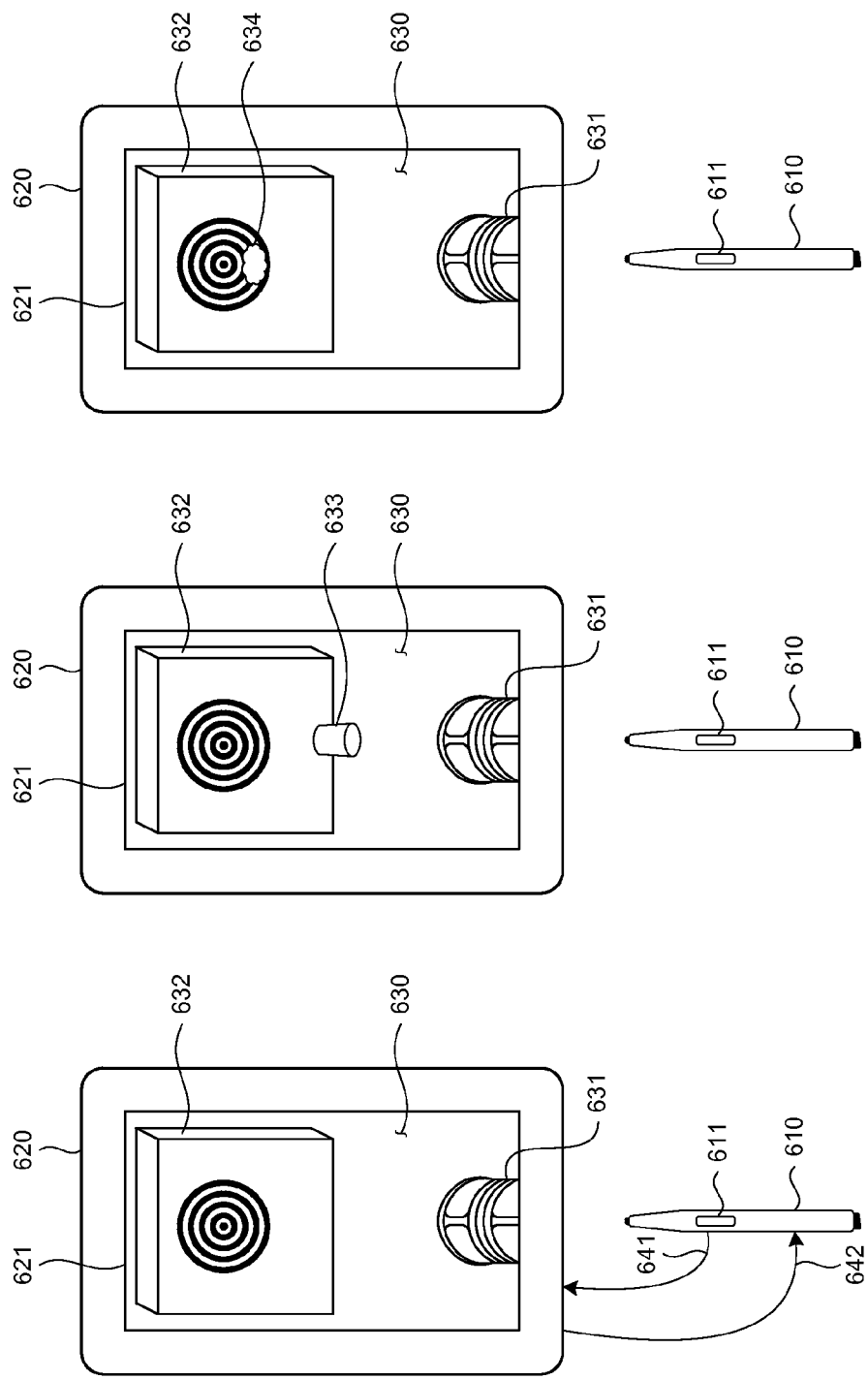

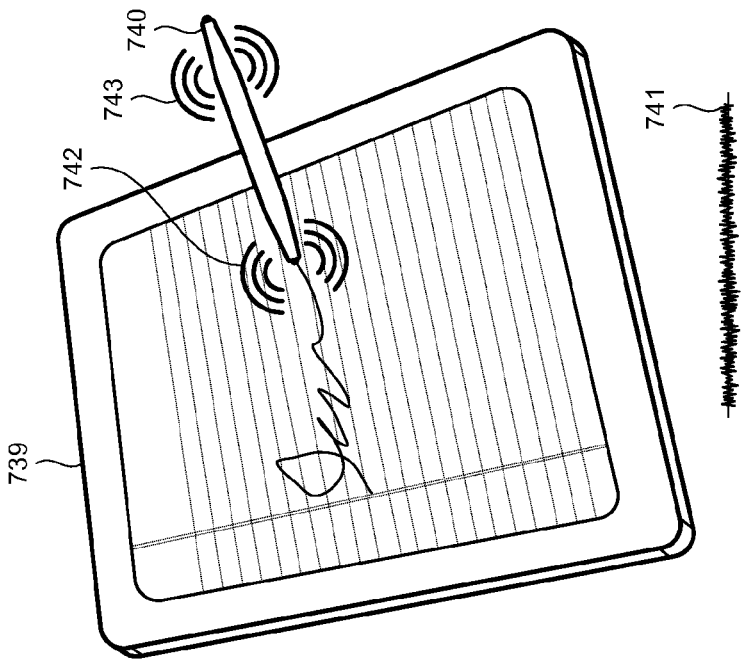
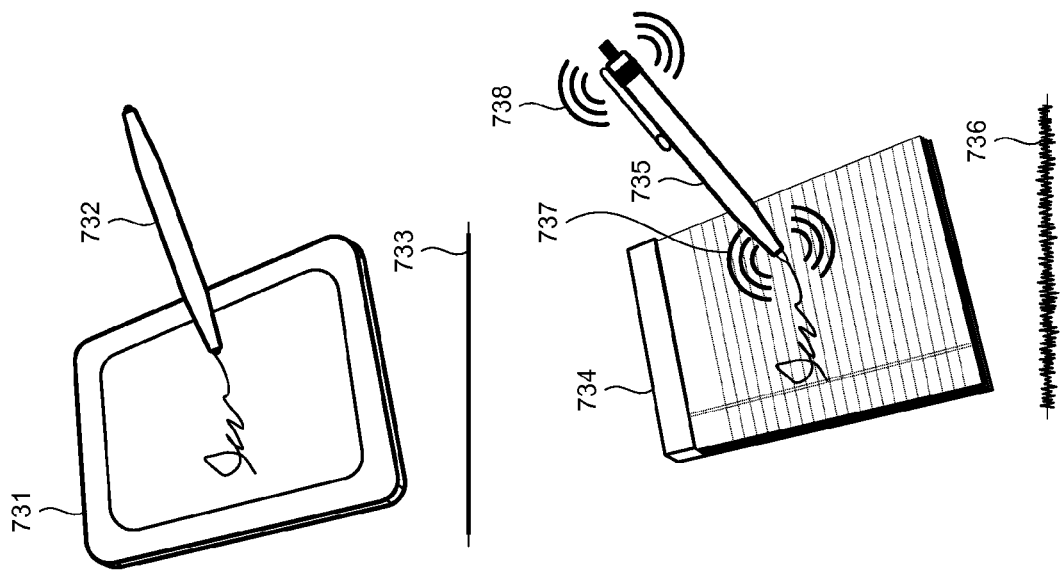
FIG. 7C

COORDINATED STYLUS HAPTIC ACTION

BACKGROUND

Touchscreen displays (or touchscreens) are visual displays that allow user interaction with the displayed image by touching the screen. Touchscreens can sense one or more touches at any given time and interpret the touches as a user input. Touches of a touchscreen can include any number of gestures, such as a point touch, a swipe, a pinch and the like. The different gestures can be interpreted as different user inputs, such as a point touch to make a selection, a swipe to scroll, a pinch to zoom and the like. Touchscreens can provide users with the convenience of not needing large input devices, such as a mouse, a keyboard and the like, to provide inputs to a user device.

Touchscreens are increasingly common in many computing devices, such as tablet computers, cell phones, gaming machines, laptop computers, GPS devices, car entertainment systems and the like. Many of these devices can be communicatively connected to communication networks, such as WiFi networks, cellular data networks and the like. Such devices can allow for convenient user input via a touchscreen while providing access to many computing resources accessible via a communication network.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 4A and 4B depict a system that includes a stylus and a computing device.

FIGS. 5A and 5B depict how haptic action in a stylus and a computing device 520 based on an angle of the stylus with respect to the computing device.

FIGS. 6A, 6B and 6C depict various instances of a stylus and a computing device, and depict asynchronous coordinated haptic action between the stylus and the computing device.

FIGS. 7A, 7B and 7C depict how coordinated haptic action in a stylus and a computing device can simulate the interaction of different materials.

DETAILED DESCRIPTION

Figure 1:
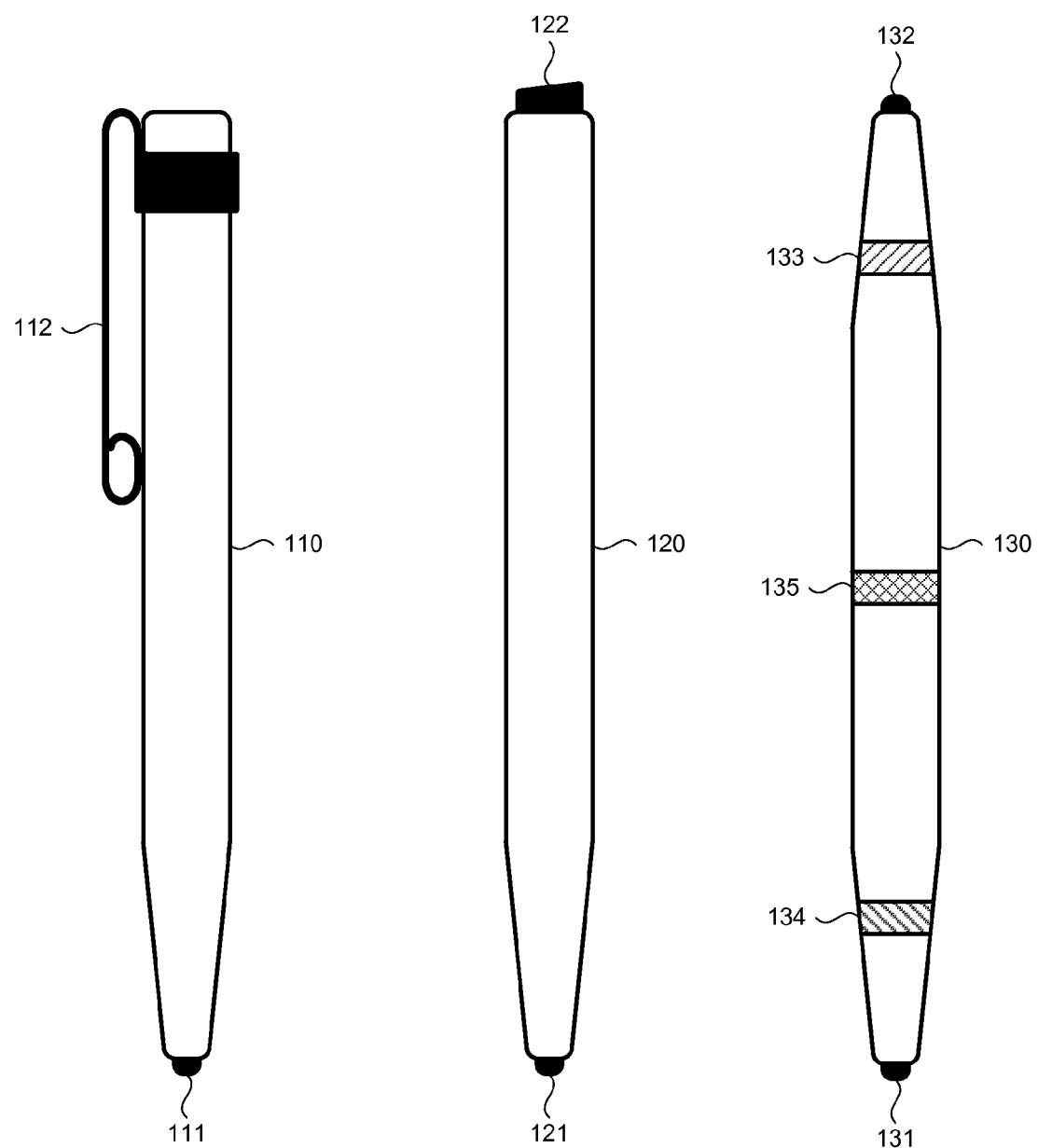
FIG. 1 depicts examples of styli that can be used to provide inputs into touchscreen devices.

There are many types of touchscreens. Capacitive touchscreens include insulating layers with conductive coatings. Touching the conducting coating with an electrical conductor distorts the conductive coating's electrostatic field, which can be measured as a change in capacitance. The electrical conductor used to touch the capacitive touchscreen can include a human finger, a capacitive tip of a stylus or any other electrical conductor. Many hand gloves are made of insulating material and prevent a gloved finger from being able to interact with touchscreen devices. However, some gloves have been developed that can allow a gloved finger to interact with a touchscreen devices, such as by weaving conductive material into the glove.

Projected capacitance touchscreens have a matrix of conductive material layered on insulating layers. Voltage is applied to the matrix to create a uniform electrostatic field. When a conductive object comes in contact with the projected capacitance touchscreen, the uniform electrostatic field is disrupted and a change in the capacitance at points along the matrix can be measured. The electrical conductor used to touch the projected capacitance touchscreen can include a human finger, a capacitive tip of a stylus or any other electrical conductor.

Resistive touchscreens include two layers of electrically resistive material that are separated from each other by a space. When one layer is depressed, the resistance between the two layers can decrease so that a voltage difference across each of the layers can be measured. Any object, such as a human finger, a gloved human finger, a tip of a stylus or any other object, can be used to depress one of the layers of a resistive touchscreen.

Many other touchscreens exist, such as infrared grid touchscreens, infrared acrylic projection touchscreens, optical imaging touchscreens, dispersive signal technology touchscreens and acoustic pulse recognition touchscreens. Regardless of the type of touchscreen used, a user can interact with the touchscreen using a touchscreen input device. A touchscreen input device is a device that includes an end that can be used to interact with a touchscreen. The end can include a capacitive tip, an electrical conductor on the tip and the like. One example of a touchscreen input device is a stylus.

Haptic feedback in user devices can improve a user's experience with a device. Haptic feedback can include any application of force, vibration, motion or other touch-sensitive feedback by a device to a user. Devices can include haptic actuators, such as rumble motors, piezo actuators, electrical impulse generators, artificial muscles and any other movement or force generator. When a particular event occurs, a device's haptic actuator can be activated so that the user feels motion associated with the event. For example, when a user makes a selection in a user interface, movement by a haptic actuator can signal to the user that the selection has been made. In another example, when a user moves an indicator (e.g., a cursor) moves onto or off of a selectable element in a user interface, movement by a haptic actuator can signal to the user that the indicator has moved onto or off of the selectable element. In yet another example, when an action that occurs in a user interface (e.g., an explosion in a first person shooter game), a corresponding movement of a haptic actuator can give the user the sense that the action can be felt through the device.

When a user interacts with a computing device (e.g., tablet computer) using a stylus, the user typically is in contact with both the computing device and the stylus. For example, the user can hold the computing device in one hand and the stylus in the other hand. If both the computing device and the stylus have at least one haptic actuator, movements of the haptic actuators in the computing device and the stylus can be coordinated to improve the user's feeling from haptic feedback. Examples and benefits of such coordinated haptic feedback between a computing device and a stylus are discussed throughout this disclosure.

FIG. 1 depicts examples of styli that can be used to provide inputs into touchscreen devices. Stylus 110 is a single-end stylus with one capacitive end 111. Stylus 110 is in the form of a pen and includes a clip 112. When the capacitive end 111 is brought close to or in contact with a touchscreen, the touchscreen can interpret the motion of the capacitive end 111 as a touch of the touchscreen. Stylus 120 is a dual-end stylus with a first capacitive end 121 and a second capacitive end 122. In the case of stylus 120, the first capacitive end 121 is smaller, like the tip of a pen or pencil, and may be referred to as the tip end of stylus 120. The second capacitive end 122 is larger, like the eraser of a pencil, and may be referred to as the eraser end of stylus 120. Stylus 130 is another dual-end stylus with a first capacitive end 131 and a second capacitive end 132. In the case of stylus 130, the first capacitive end 131 and second capacitive end 132 are approximately the same size and the stylus 130 itself is approximately symmetrical. Possible uses of the two ends of a dual-end stylus are described in more detail below.

A stylus can also include any number of other features. For example, a stylus can have features that can aid a computing device in determining an orientation of the stylus with respect to the device. For example, the stylus 130 includes a first color region 133 and a second color region 134. These color regions 133 and 134 are shown as striped, but could also be dots or any other shape. The color regions 133 and 134 can be different colors so that a camera or other light-sensing component on a computing device can determine which end of the stylus 130 is closest to the computing device. The stylus 130 could also include a third color region 135 (or any number of other color regions) to aid in determining the orientation of the stylus 130 with respect to the computing device. Having more than two color regions may help determine orientation in the case where one of the color regions is obscured, such as being obscured by the user's hand. In another example, different ends of the stylus can emit light, or other electromagnetic radiation, at different wavelengths. In this example, a stylus may emit red light from one end and blue light from the other end and the computing device may be able to determine the color of light emitted from the end closest to the computing device. Similar examples are possible with non-visible electromagnetic radiation, such as infrared or ultraviolet electromagnetic radiation. In yet another example, a stylus can include reflective portions that reflect light or other electromagnetic radiation emitted by a computing device Other features of a stylus can include magnetic ends that can be detected by a computing device, buttons that allow for additional user inputs, microphones that can record sound, speakers that can play sounds, haptic elements that can respond to user interactions, lasers that can emit light in a particular direction or any other similar feature. Some features of such a stylus may require power, and the stylus can include a battery or other power source. In one example, a battery in a stylus can be charged inductively from a computing device that is in proximity with the stylus so that the stylus recharges as it is used to provide inputs to a computing device.

Figure 2A:
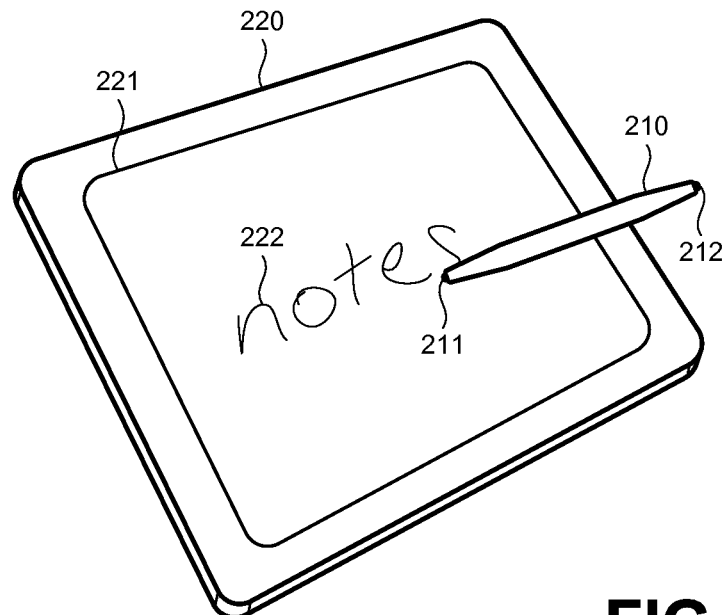
FIGS. 2A and 2B depict instances of a stylus being used with a computing device.
Figure 2B:
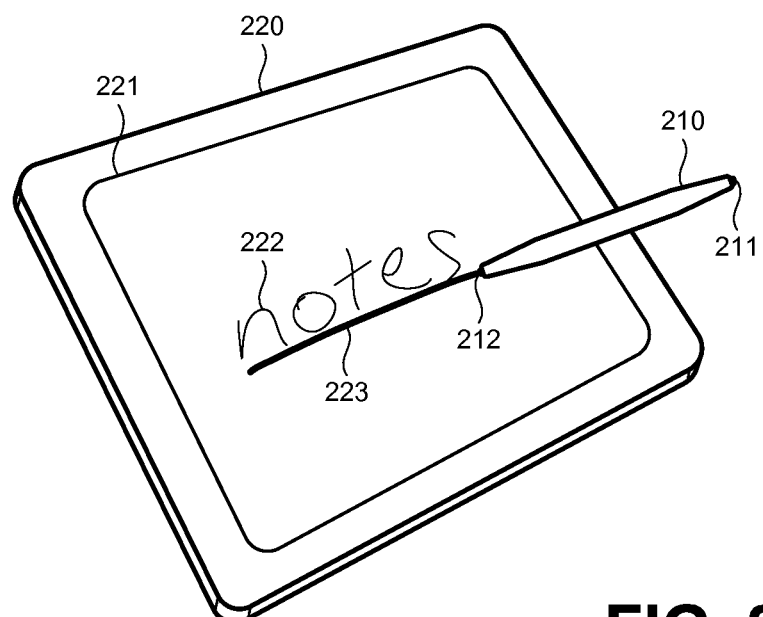

FIGS. 2A and 2B depict instances of a stylus 210 being used with a computing device 220. In the particular instances shown, stylus 210 is a dual-end stylus with a first capacitive end 211 and a second capacitive end 212, and computing device 220 is a tablet with a touchscreen 221. In the instance shown in FIG. 2A, the first capacitive end 211 of the stylus 210 is used to input letters 222 into the touchscreen 221. To make the letters 222, the user can press the first capacitive end 211 of the stylus 210 into the touchscreen 221 and then drag the first capacitive end 211 of the stylus 210 across the touchscreen 221. In the instance shown in FIG. 2B, the second capacitive end 212 of the stylus 210 is used to input a line 223 into the touchscreen 221. To make the line 223, the user can press the second capacitive end 212 of the stylus 210 into the touchscreen 221 and then drag the second capacitive end 212 of the stylus 210 across the touchscreen 221.

In the embodiment shown in FIGS. 2A and 2B, the lines on the touchscreen 221 for the letters 222 are thinner than the line 223 on the touchscreen 221. This difference may be due to the use of different ends of the stylus 210 with the touchscreen 221. The one of the first and second capacitive ends 211 and 212 that is used to touch touchscreen 221 can be determined in a number of ways. In one example, the computing device 220 may be able to determine an orientation of the stylus 210. The computing device 220 can include a camera of the computing device 220 that can take an image of the stylus 210 during operation and processing the image to determine which of the first and second capacitive ends 211 and 212 is used to touch touchscreen 221. In another example, the stylus 210 may include a characteristic, such as a magnet near one of the first and second capacitive ends 211 and 212, that can be detected by the computing device 220 to determine which of the first and second capacitive ends 211 and 212 is used to touch touchscreen 221. In another example, the stylus 210 can include one or more sensors, such as a gyroscope, an accelerometer and the like, that can be used to determine orientation of the first and second capacitive ends 211 and 212 with respect to the computing device 220, and the stylus 210 can send an indication of the orientation to the computing device 220 via a wireless communication link, such as a Bluetooth® communication link, a near field communication (NFC) link, a WiFi communication link and the like. In yet another example, the first and second capacitive ends 211 and 212 may have different sizes (such as in the case of the first and second capacitive ends 121 and 122 of stylus 120 in FIG. 1). The touchscreen 221 may be able to sense the different sizes of the first and second capacitive ends 211 and 212 to determine which of the first and second capacitive ends 211 and 212 is used to touch touchscreen 221. Any number of other ways could be used to determine which of the first and second capacitive ends 211 and 212 is used to touch touchscreen 221. The computing device 220 can interpret the uses of the first and second capacitive ends 211 and 212 as different types of user inputs, such as the thin lines of letters 222 and the thick line 223.

While FIGS. 2A and 2B depict user inputs in the form of letters 222 and a line 223, many other user inputs are possible. A stylus can be used to select a group of items, such as files, songs and the like. A stylus can be used to make selections, such as selecting a particular file or song, selecting an option from a list of options and the like. In one example, the first capacitive end 211 of stylus 210 can be used to copy text and/or files, and the second capacitive end 212 of stylus 210 can be used to paste the copies of text and/or files. In another example, the first capacitive end 211 of stylus 210 can be used to input information, such as text, lines and the like, and the second capacitive end 212 of stylus 210 can be used to navigate, such as by scrolling, zooming and the like.

Figure 3:
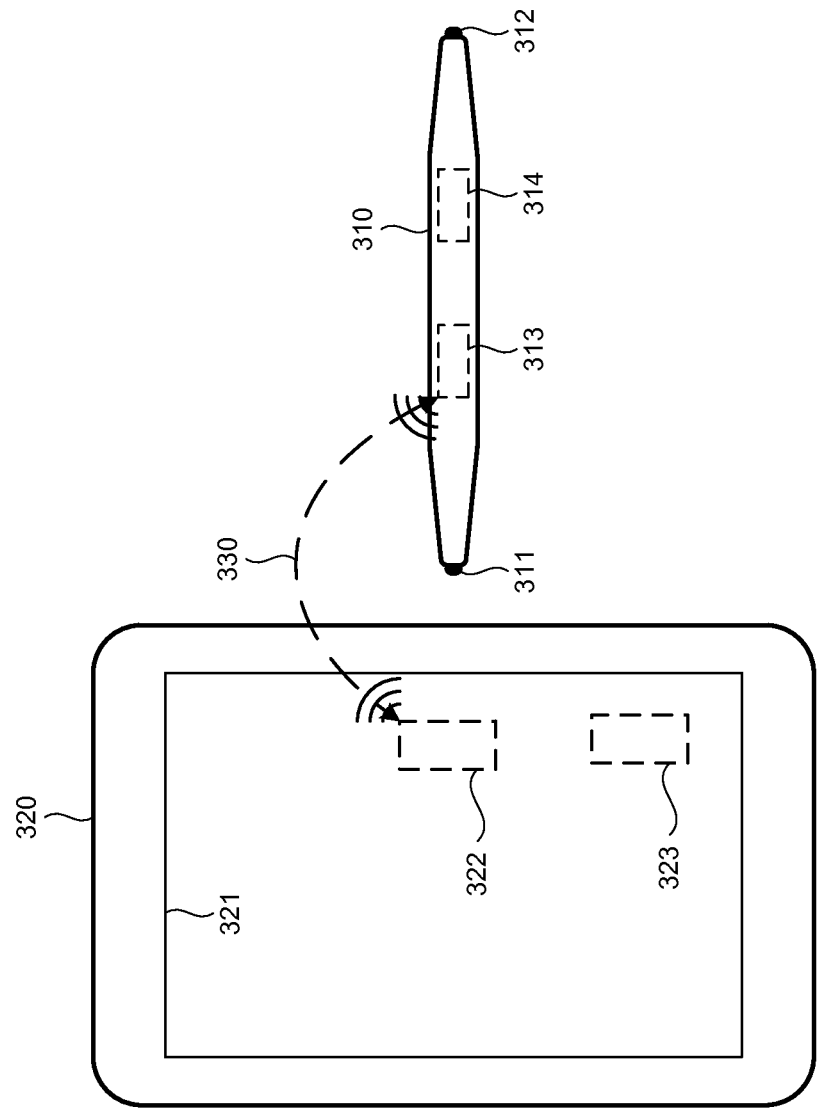
FIG. 3 depicts an embodiment of a touchscreen input device and a computing device that have haptic actuators.

FIG. 3 depicts an embodiment of a touchscreen input device 310 that can communicate with a computing device 320. The touchscreen input device 310 is in the form of a dual-end stylus with a first capacitive end 311 and a second capacitive end 312. The touchscreen input device 310 also includes a wireless communication device 313. The wireless communication device 313 can be a Bluetooth® transceiver, a WiFi transceiver, an NFC transceiver or transmitter, a radio frequency identification (RFID) transceiver or transmitter or any other type of wireless communication device. In some embodiments, such as in the case of a Bluetooth® transceiver or a WiFi transceiver, the wireless communication device 313 may be a powered device that received power from a battery or other power source in touchscreen input device 310. In such a case, the power source in touchscreen input device 310 can be an inductively chargeable power source that is charged via an indication field generated by the computing device 320. In other embodiments, the wireless communication device 313 may be a passive device, such as an NFC transmitter or an RFID transmitter, that does not require a power source on the touchscreen input device 310. The touchscreen input device 310 also includes a haptic actuator 314. The haptic actuator 314 can include one or more of a rumble motor, a piezo actuator, an electrical impulse generator, an artificial muscle or any other type of movement or force generator.

The computing device 320 includes a touchscreen 321 and a wireless communication device 322. The first and second capacitive ends 311 and 312 of the touchscreen input device 310 can be used to provide inputs to the touchscreen 321. Wireless communication device 322 can be a Bluetooth® transceiver, a WiFi transceiver, an NFC transceiver or receiver, a radio frequency identification (RFID) transceiver or receiver or any other type of wireless communication device. Wireless signals 330 can be sent between the wireless communication device 313 of the touchscreen input device 310 and the wireless communication device 322 of the computing device 320. The computing device 320 also includes a haptic actuator 323. The haptic actuator 323 can include one or more of a rumble motor, a piezo actuator, an electrical impulse generator, an artificial muscle or any other type of movement or force generator.

The wireless signals 330 may be used to communicate a variety of information. For example, the wireless signals 330 can carry an identifier of the touchscreen input device 310 to the computing device 320. The touchscreen input device 310 can be operable to send the identifier of the touchscreen input device 310 at particular times, such as when the touchscreen input device 310 is brought into proximity with the computing device 320, when one of the first and second capacitive ends 311 or 312 of the touchscreen input device 310 is brought into contact with the touchscreen 321 of the computing device 320 and the like. The identifier of the touchscreen input device 310 can indicate to the computing device 320 that the touchscreen input device 310 has a haptic actuator 314 or other haptic capabilities.

In another example, the wireless signals 330 can carry haptic actuation instructions from the computing device 320 to the touchscreen input device 310. The haptic actuation instructions can includes information about how haptic actuator 314 should operate. In one embodiment, the actuation instructions can include one or more of a start time, a duration, a direction of force, an amount of force, a frequency of vibrations or any other measure of haptic actuation. In another embodiment, the actuation instructions can include a code or other identifier of a particular haptic action. The touchscreen input device 310 can include a database of haptic actions for certain haptic codes or identifiers and the touchscreen input device 310 can perform the appropriate haptic action in response to receiving such a code. In another embodiment, the actuation instructions can include a set of haptic actions for storage on the touchscreen input device 310. Such a set of haptic actions can be defined by a developer of an application, a developer of an operating system or any other person or entity. Once the particular set of haptic actions has been stored on the touchscreen input device 310, subsequent haptic instructions can include merely a code or other identifier of one of the haptic actions in the set of haptic actions.

In another example, the wireless signals 330 can carry indications of user inputs from the touchscreen input device 310 to the computing device 320. The touchscreen input device 310 can have a button, a scroll wheel, a touchpad or any other user input device. When a user input is received by such a user input device, the touchscreen input device 310 can send an indication of the user input to the computing device 320. In one embodiment, movements of the touchscreen input device 310 near a display of the computing device 320 can cause a cursor to move on the display. If a user pushes a button on the touchscreen input device 310, the touchscreen input device 310 can send an indication that the button has been pushed to the computing device 320, and the computing device 320 can interpret the pushing of the button on the touchscreen input device 310 as a selection of the point at which the cursor is located.

FIGS. 4A and 4B depict a system 400 that includes a stylus 410 and a computing device 420. The computing device 420 includes a display 421 that depicts a number of selectable elements, including selectable element 422. In FIG. 4A, the stylus 410 is moved from a first position 401 to a second position 402. At the first position 401, one end of the stylus 410 is hovering over a location of display 421 that does not include a selectable element. For an end of the stylus 410 to hover over the display 421, the end of the stylus 410 can be located over that location within a predetermined distance (e.g., within one inch) of the display 421, the end of the stylus 410 can be in contact with the display 421 without enough force to register as a user selection at that location, the end of the stylus 410 can be pointed at that particular location, or the end of the stylus 410 can otherwise be hovering over that location of the display 421 in any other matter. At the second position 402, the end of the stylus 410 is hovering over a location of display 421 that includes selectable element 422.

In response to the end of the stylus 410 moving into a position hovering over selectable element 422, the computing device 420 can coordinate haptic action by both the stylus 410 and the computing device 420. As part of coordinating the haptic action by both the stylus 410 and the computing device 420, the computing device 420 can send haptic instructions 451 wirelessly to the stylus 410 for activating a haptic actuator on the stylus 410 and activating a haptic actuator in the computing device 420.

In FIG. 4B, the stylus 410 is moved from the second position 402 to a third position 403. At the third position 403, one end of the stylus 410 is hovering over a location of display 421 that does not include a selectable element. In response to the end of the stylus 410 moving into a position that is not hovering over selectable element 422, the computing device 420 can coordinate haptic action by both the stylus 410 and the computing device 420. As part of coordinating the haptic action by both the stylus 410 and the computing device 420, the computing device 420 can send haptic instructions 452 wirelessly to the stylus 410 for activating a haptic actuator on the stylus 410 and activate a haptic actuator in the computing device 420.

The haptic action by the haptic actuator on the stylus 410 and the haptic action by the haptic actuator in the computing device 420 can be coordinated in any number of ways. In one example, as the end of the stylus moves into a position where it is hovering over selectable element 422, the haptic actuator on the stylus 410 and the haptic actuator in the computing device 420 can activate at approximately the same time (i.e., approximately synchronously) to indicate that the stylus 410 is hovering over a selectable element. Similarly, as the end of the stylus moves into a position where it is no longer hovering over selectable element 422, the haptic actuator on the stylus 410 and the haptic actuator in the computing device 420 can activate at approximately the same time to indicate that the stylus 410 is hovering over a selectable element. In one embodiment, the haptic action by both the computing device 420 and the stylus 410, when the stylus 410 begins hovering over selectable element 422, has a greater force than the action by both the computing device 420 and the stylus 410 when the stylus 410 stops hovering over selectable element 422. In another example, haptic action in both the computing device 420 and the stylus 410 can be directed in a particular direction based on the interaction of the stylus 410 with the selectable element 422. In the motion shown in FIG. 4A, as the stylus 410 begins hovering over the selectable element 422, the haptic instructions 451 can indicate that the haptic actuator in the stylus 410 should cause an upward force on the stylus 410, and the computing device 420 can actuate haptic actuator in the computing device 420 to cause a downward force on the computing device 420. This coordinated haptic action can give the user a feeling that the stylus 410 moved "uphill" to get "on top of" the selectable element 422. Similarly, in the motion shown in FIG. 4B, as the stylus 410 ends hovering over the selectable element 422, the haptic instructions 452 can indicate that the haptic actuator in the stylus 410 should cause a downward force on the stylus 410 and the computing device 420 can actuate haptic actuator in the computing device 420 to cause an upward force on the computing device 420. This coordinated haptic action can give the user a feeling that the stylus 410 moved "downhill" to get "off of" the selectable element 422. Many other examples of such coordinated haptic action in the stylus 410 and the computing device 420 are possible.

FIGS. 5A and 5B depict how haptic action in a stylus 510 and a computing device 520 based on an angle of the stylus 510 with respect to the computing device 520. In both FIGS. 5A and 5B, a side view of the computing device 520 is depicted with a display 521 of the computing device 520 being located on the top of the computing device 520. FIG. 5A depicts the stylus 510 at an angle 530 with respect to the computing device 520 at a first instance 501, a second instance 502 and a third instance 503. The stylus 510 may not be hovering over a selectable element in the display 521 at the first instance 501; the stylus 510 may be hovering over a selectable element in the display 521 at the second instance 502; and the stylus 510 may not be hovering over a selectable element in the display 521 at the third instance 503. Thus, as the stylus 510 moves from the first instance 501 to the second instance 502, coordinated haptic action in both the stylus 510 and the computing device 520 can indicate to the user that the stylus 510 has moved onto the selectable element. Similarly, as the stylus 510 moves from the second instance 502 to the third instance 503, coordinated haptic action in both the stylus 510 and the computing device 520 can indicate to the user that the stylus 510 has moved off of the selectable element.

FIG. 5B depicts the stylus 510 at an angle 531 with respect to the computing device 520 at a fourth instance 504, a fifth instance 505 and a sixth instance 506. The angle 531 is greater than the angle 530 such that the stylus 510 is angled more to the left in FIG. 5B than in FIG. 5A. The stylus 510 may not be hovering over a selectable element in the display 521 at the fourth instance 504; the stylus 510 may be hovering over a selectable element in the display 521 at the fifth instance 505; and the stylus 510 may not be hovering over a selectable element in the display 521 at the sixth instance 506. Thus, as the stylus 510 moves from the fourth instance 504 to the fifth instance 505, coordinated haptic action in both the stylus 510 and the computing device 520 can indicate to the user that the stylus 510 has moved onto the selectable element. Similarly, as the stylus 510 moves from the fifth instance 505 to the sixth instance 506, coordinated haptic action in both the stylus 510 and the computing device 520 can indicate to the user that the stylus 510 has moved off of the selectable element.

If the stylus 510 were a pen and the computing device 520 were a pad of paper, the user would experience greater resistance in the movement of the pen from left to right at the angle 531 depicted in FIG. 5B than moving the pen from left to right at the angle 530 depicted in FIG. 5A. Similarly, if the stylus 510 were a pen and the computing device 520 were a pad of paper, the user would experience less resistance in the movement of the pen from right to left at the angle 531 depicted in FIG. 5B than moving the pen from right to left at the angle 530 depicted in FIG. 5A. In one embodiment, the coordinated haptic action in both the stylus 510 and the computing device 520 can have greater force when the stylus 510 moves from the fourth instance 504 to the fifth instance 505 than when the stylus 510 moves from the first instance 501 to the second instance 502. The greater force can feel to the user as if there is more resistance to the movement of the stylus from left to right when the stylus 510 is at a greater angle 531 in FIG. 5B than at a lesser angle 530 in FIG. 5A. In another embodiment, the coordinated haptic action in both the stylus 510 and the computing device 520 can have less force when the stylus 510 moves from the fifth instance 505 to the sixth instance 506 than when the stylus 510 moves from the second instance 502 to the third instance 503. The lesser force can feel to the user as if there is less resistance to the movement of the stylus from right to left when the stylus 510 is at a greater angle 531 in FIG. 5B than at a lesser angle 530 in FIG. 5A. Any number of other differences in coordinated haptic action between the stylus 510 and the computing device 520 are possible based on the respective positions of the stylus 510 and the computing device 520.

FIGS. 6A, 6B, and 6C depict various instances of a stylus 610 and a computing device 620, and depict asynchronous coordinated haptic action between the stylus 610 and the computing device 620. The stylus 610 includes a button 611 that can be pressed by a user. The computing device 620 includes a display 621. In FIGS. 6A, 6B and 6C, the display 621 depicts various instances of a first-person shooter game 630 in which the user can control a grenade launcher 631 using the stylus 610. For example, the user may be able to aim the grenade launcher 631 by pointing the stylus at different locations on the display 621. In another example, the user may be able to fire the grenade launcher 631 by pressing the button 611 on the stylus 610.

In FIG. 6A, the user may press the button 611 of the stylus 610 to fire the grenade launcher 631. The stylus 610 can send a signal 641 to the computing device 620 to indicate that the button 611 was pressed. The computing device 620 can provide that indication to the first-person shooter game 630, and the computing device 620 can send a signal 642 to the stylus 610 with haptic instructions. The haptic instructions in signal 642 can indicate that a haptic actuator in stylus 610 should provide a force away from the display 621. Such a haptic action with a force away from the display 621 can give the user a feeling of the grenade launcher 631 kicking back while firing.

In FIG. 6B, the first-person shooter game 630 can display a grenade 633 travelling from the grenade launcher 631 to the target 632. In one embodiment, neither the stylus 610 nor the computing device 620 may have any haptic action. In another embodiment, as the grenade 633 leaves the grenade launcher 631, the stylus 610 can have a haptic action of a low rumble that diminishes to no rumble as the grenade 633 approaches the target 632. Similarly, as the grenade 633 leaves the grenade launcher 631, the computing device 620 can have a haptic action of no rumble that crescendos to a low rumble as the grenade 633 approaches the target 632. The computing device 620 can send haptic instructions for the flight of the grenade in the signal 642 or in another signal.

In FIG. 6C, the first-person shooter game 630 can display an explosion 634 of the grenade 633 on the target 632. As the grenade 633 explodes, the computing device 620 can cause its own haptic actuator to move to simulate a blast associated with the explosion 634 of the grenade 633 on the target 632. Thus, the asynchronous coordinated haptic action depicted in FIGS. 6A, 6B and 6C can include the haptic action of the stylus 610 moving back with the firing of the grenade launcher 631 and the haptic action of the computing device 620 with the explosion 634 of the grenade 633 on the target 632. The asynchronous coordinated haptic action can also include the rumblings of the stylus 610 and the computing device 620 during the flight of the grenade 633 from the grenade launcher 631 to the target 632. To a user that is holding the stylus 610 in one hand and the computing device 620 in another hand, the user will feel the haptic action of both the stylus 610 and the computing device 620 in different hands. This may give the user a much richer experience with the first-person shooter game 630 than the user may otherwise experience.

Figure 7A:
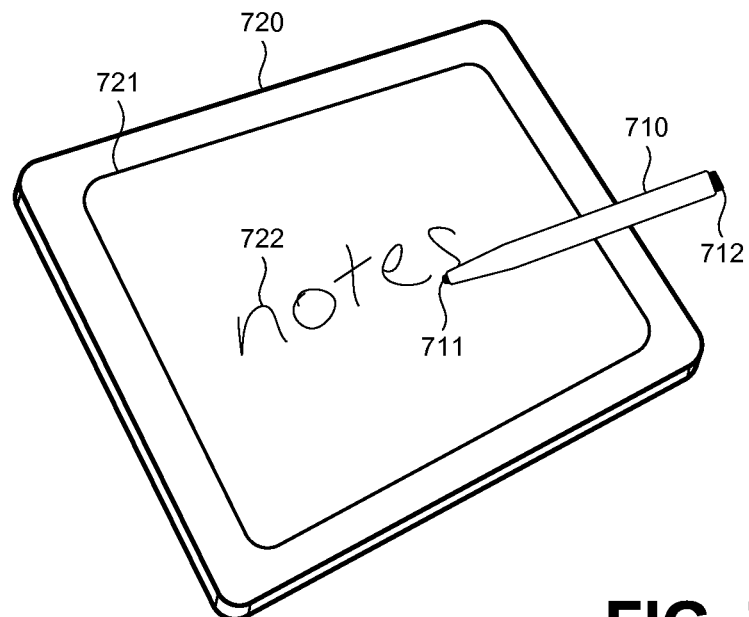
Figure 7B:
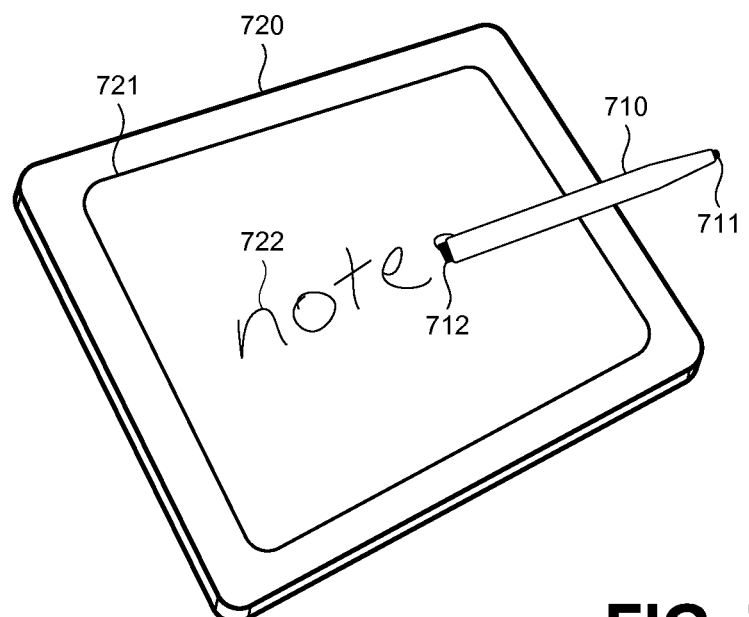

FIGS. 7A and 7B depict how coordinated haptic action in a stylus 710 and a computing device 720 can simulate the interaction of different materials. The stylus 710 includes a first end 711 and a second end 712. The first end 711 can be in the form of a writing end of a pencil and the second end 712 can be in the form of a pencil eraser. The computing device 720 includes a display 721. The user can write letters 722 or other marks on the display 721 using the first end 711 of the stylus 710 (as shown in FIG. 7A), and the user can erase the letters 722 or other marks using the second end 712 of the stylus 710 (as shown in FIG. 7B).

One complaint of stylus users is that an end of a stylus moving along smooth glass of a display does not accurately reflect how it would feel to write on paper or any other material using a writing implement (e.g., a pen, a pencil, etc.). For example, as a pencil moves on paper, the slight defects in the paper may cause the pencil to slightly move up and down. A user may not normally perceive these small movements, but the user may be accustomed to such movements as typical when using a pencil to write on paper. Similarly, erasing marks from a paper feels much different as moving the rubber or other material of an eraser along paper likely does not feel the same as moving a stylus along the smooth glass of a display. To address these issues, coordinated haptic action between the stylus 710 and the computing device 720 could provide the feel of moving a particular writing instrument across a particular medium.

In one example, in FIG. 7A, the computing device 720 could determine that the user is attempting to write the letters 722 as if using a pencil on paper. The computing device 720 can send haptic instructions to the stylus 710 to make slight haptic actions so that the stylus feels like a pencil might move when writing letters 722. The haptic action may be so slight that the user may not fully perceive the haptic action even though the haptic action provides the user with the correct feel. The computing device 720 can also activate its own haptic actuator to reflect how a pad of paper would feel when a pencil is moved across the pad. Again, such movements may be so slight that the user cannot actually perceive the haptic action by the computing device 720, even though such haptic actions produce the correct feel for the user. In this way, when the user is holding the stylus 710 in one hand and the computing device 720 in another hand, the feelings the user experiences in both hands could be very similar to the feelings that the user would experience when holding a pad of paper in one hand and writing with a pencil in the other hand. In other embodiments, the computing device 720 may determine that the user is intending to write on other media (e.g., card stock, poster board, cardboard, etc.) with different implements (e.g., a pen, a marker, etc.).

In another example, in FIG. 7B the computing device 720 could determine that the user is attempting to erase the letters 722 as if erasing letters from paper using a rubber eraser. The computing device 720 can send haptic instructions to the stylus 710 to make more pronounced haptic actions so that the stylus feels as though a pencil eraser is moving on paper. The computing device 720 can also activate its own haptic actuator to reflect how a pad of paper would feel when an eraser is moved across the pad. The haptic action simulating an eraser moving along paper can be more pronounced than the haptic action of a pencil on paper. In this way, when the user is holding the stylus 710 in one hand and the computing device 720 in another hand, the feelings the user experiences in both hands could be very similar to the feelings that the user would experience when holding a pad of paper in one hand and erasing with a pencil eraser in the other hand. In other embodiments, the computing device 720 may determine that the user is intending to write on other media (e.g., card stock, poster board, cardboard, etc.) with different implements (e.g., a pen, a marker, etc.).

In one embodiment, the first end 711 of the stylus 710 can have a replaceable tip that permits a user to remove the tip on the first end 711 and replace the tip with another tip. Each tip may represent a different type of writing implement, such as a hard lead pencil, a soft lead pencil, a mechanical pencil, a ballpoint pen, a rollerball pen or any other type of writing implement. The stylus 710 may be able to determine the type of tip that is on the first end 711. For example, each tip may store a different identifier that can be read by the stylus 710 when the tip is properly placed on the first end 711. The stylus 710 can communicate the type of tip on the first end 711 to the computing device 720, and the computing device 720 can take the type of tip into account when determining which haptic instructions are sent to the stylus 710 and how the computing device 720 activates its own haptic actuator.

FIG. 7C further depicts how coordinated haptic action in a stylus and a computing device can simulate the interaction of different materials. FIG. 7C shows a computing device 731 and a stylus 732. As a user moves the stylus 732 across a touchscreen of the computing device 731, the user experiences little to no friction or roughness from the interaction of the screen of the computing device 731 and the stylus 732. A chart 733 indicates the friction or roughness experienced by the user as the stylus 732 moves across the touchscreen of the computing device 731. FIG. 7C also shows a pad 734 and a pen 735. As a user moves the pen 735 across a piece of paper on the pad 734, the user experiences various degrees of friction or roughness from the interaction of the piece of paper on the pad 734 and the pen 735. A chart 736 indicates the friction or roughness experienced by the user as the pen 735 moves across the piece of paper on the pad 734. Vibrations experienced in the pad 734 are indicated by vibrations 737 and vibrations experienced in the pen 735 are indicated by vibrations 738.

FIG. 7C also shows a computing device 739 and a stylus 740. As a user moves the stylus 740 across a touchscreen of the computing device 739, the user experiences little to no friction or roughness from the interaction of the screen of the computing device 739 and the stylus 740. However, as the stylus 740 is moved across the touchscreen of the computing device 739, the computing device 739 can cause coordinated haptic action such that haptic action 742 by the computing device 739 and haptic action 743 by the stylus 740 give the user the feeling of friction or roughness. More specifically, haptic action 742 by the computing device 739 can be similar to the vibrations 737 experienced in the pad 734 and haptic action 743 by the stylus 740 can be similar to the vibrations 738 experienced in the pen 735. A chart 741 indicates the feeling of friction or roughness experienced by the user as the stylus 740 moves across the touchscreen of the computing device 739 based on the haptic action 742 of the computing device 739 and the haptic action 743 of the stylus 740. The chart 741 may reflect a similar feeling experienced by a user of the computing device 739 and the stylus 740 as the feeling experienced by a user of the pad 734 and the pen 735.

Figure 8:
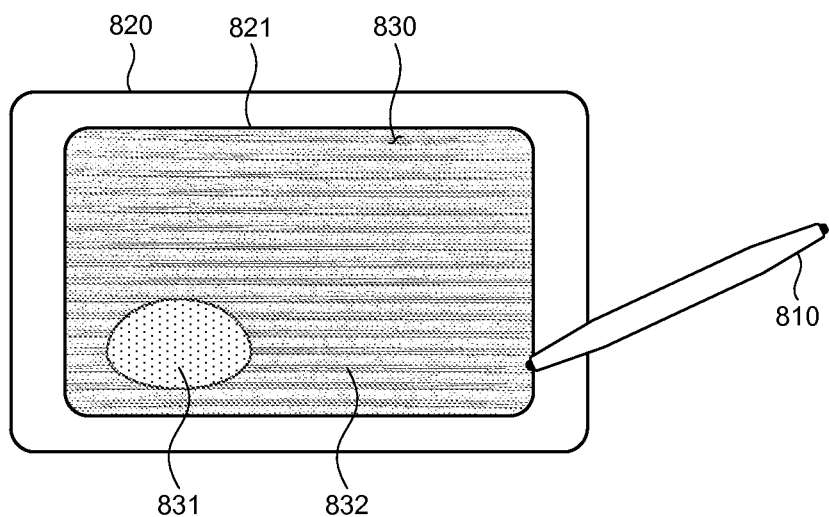
FIG. 8 depicts another example of a situation where coordinated haptic action between a stylus and a computing device can enrich a user experience.

FIG. 8 depicts another example of a situation where coordinated haptic action between a stylus 810 and a computing device 820 can enrich a user experience. In FIG. 8, the computing device 820 includes a display 821. A sand garden application 830 is shown in display 821. The sand garden application 830 can display sand that can be moved by the stylus 810 as if the stylus 810 is a rake. In this example, the movement of a stylus tip across the smooth glass of the display 821 would not provide the same feeling of the movement of a rake through sand. To address this issue, the computing device 820 can determine which haptic actions that both the stylus 810 and the computing device 820 should make, send haptic instructions to the stylus 810 and activate a haptic actuator of the computing device 820. The coordinated haptic actions of the stylus 810 and the computing device 820 can give the user the feeling that the user is holding a sand garden in the hand that holds the computing device 820 and that the user is moving a rake through the sand 831 using the hand that is holding the stylus 810. Similarly, in another area of the display 821, the display includes a smooth rock 832. As the stylus 810 moves across the area of the display 821 with the smooth rock 832, the coordinated haptic actions of the stylus 810 and the computing device 820 can be low or cease entirely to give the user the feeling that the user is moving over something smooth.

Figure 9:
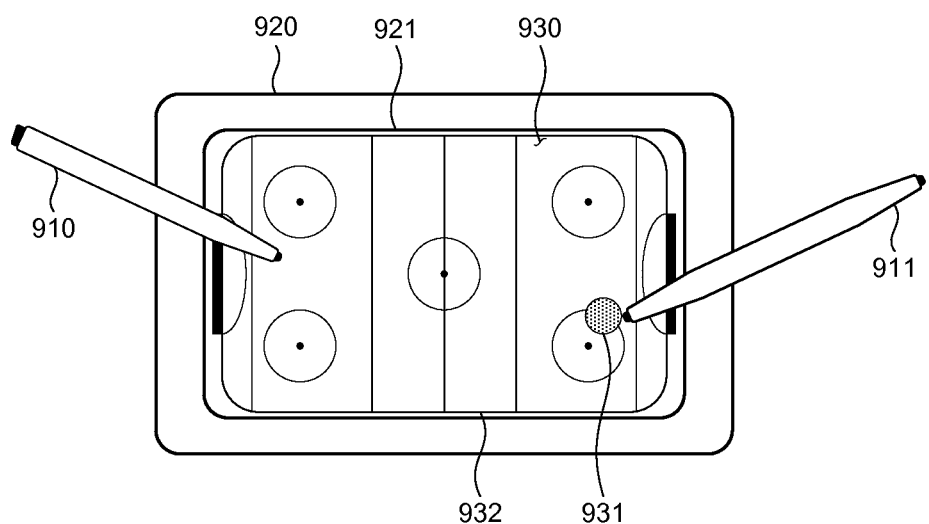
FIG. 9 depicts an example of coordinated haptic actions between a computing device and multiple styli.

FIG. 9 depicts an example of coordinated haptic actions between a computing device 920 and multiple styli 910 and 911. Computing device 920 includes a display 921. A multiplayer air hockey game 930 is depicted in in the display 921 of FIG. 9. The two styli 910 and 911 can be used by two different players in the same way that the users might use paddles on an air hockey table. Since paddles are intended to move smoothly across an air hockey table, the movements of the styli 910 and 911 along the smooth glass of the display 921 may feel appropriate to the user without any haptic action by the computing device 920 or the styli 910 and 911. However, movement of a puck 931 within the game may cause the computing device 920 to coordinate haptic action by the computing device 920 and the styli 910 and 911. For example, when the puck 931 bumps into an end of the stylus 910, the computing device 920 can send haptic instructions to the stylus 910 to exert a force in a direction away from the puck 931 and/or cause a haptic actuator of the computing device 920 to activate in some way. Similarly, when the puck 931 bumps into an end of the stylus 911, the computing device 920 can send haptic instructions to the stylus 911 to exert a force is a direction away from the puck 931 and/or cause a haptic actuator of the computing device 920 to activate in some way. Similarly, if the puck 931 bounces into any of the walls 932 of the displayed air hockey table, the computing device 920 can cause a haptic actuator of the computing device 920 to activate in some way. Coordinating the haptic actions of the computing device 920 and the styli 910 and 911 can give the users of the styli 910 and 911 sensations similar to those experienced by users of real air hockey tables.

Figure 10A:
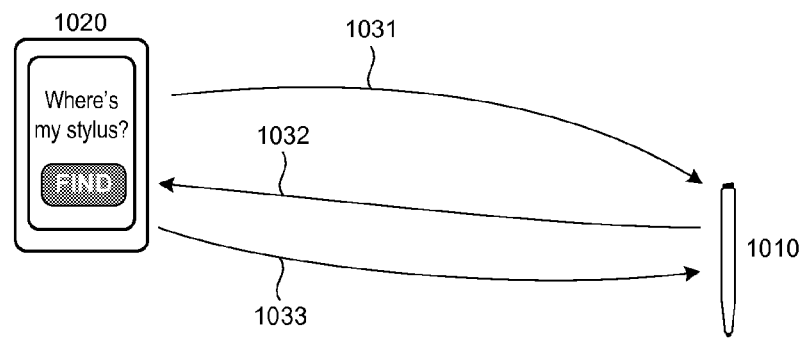
FIGS. 10A, 10B and 10C depict an example of how coordinated haptic action between a stylus and a computing device can help locate the stylus.
Figure 10B:
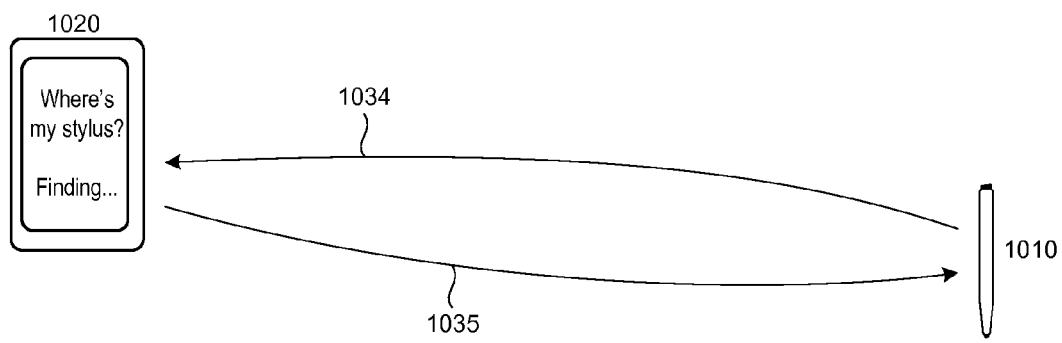
Figure 10C:
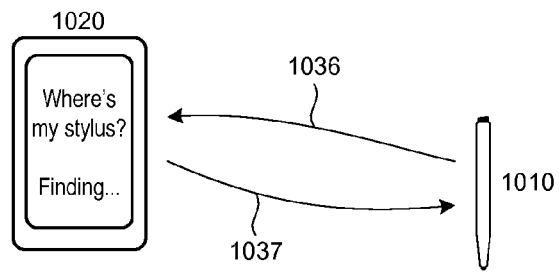

FIGS. 10A, 10B and 10C depict an example of how coordinated haptic action between a stylus 1010 and a computing device 1020 can help locate the stylus 1010. Styli are generally smaller than computing devices and easier to lose. In some examples, a stylus can be lost by falling between cushions on a couch, a stylus can be misplaced in a pen/pencil drawer, a child can run off with a stylus and a stylus can be lost in many other ways. In many instances, a lost stylus can be in an area where the stylus is still in wireless communication with a computing device (e.g., within range of a Bluetooth connection between the stylus and the computing device, within range of the same WiFi network, etc.). If a lost stylus is in an area where the stylus is still in wireless communication with a computing device, the computing device can coordinate haptic action between the stylus and the computing device to help a user find the stylus.

In FIG. 10A, the stylus 1010 and the computing device 1020 can be located within wireless communication of each other. A user can request that the computing device 1020 aid in finding the stylus 1010, such as by pressing the "FIND" button depicted on computing device 1020 in FIG. 10A. After receiving such a user input, the computing device 1020 can send a signal 1031 to the stylus 1010, including a request for a reply from the stylus 1010. The stylus 1010 can respond by sending a signal 1032 back to the computing device 1020. The computing device 1020 can estimate a distance between the stylus 1010 and the computing device 1020 based on a signal strength of the signal 1032 from the stylus 1010. Based on the estimated distance, the computing device can determine a first frequency at which haptic actuators in both the stylus 1010 and the computing device 1020 should be activated. The computing device 1020 can activate its own haptic actuator based on the first frequency and the computing device 1020 can send a signal 1033 to the stylus with haptic instructions for activating a haptic actuator in the stylus based on the first frequency. In one embodiment, the first frequency at which haptic actuators in both the stylus 1010 and the computing device 1020 are activated can be lower if the stylus 1010 and the computing device 1020 are farther away from each other and higher if the stylus 1010 and the computing device 1020 are closer to each other.

In FIG. 10B, the stylus 1010 and the computing device 1020 are farther away from each other than they were in FIG. 10A. While a haptic actuator of the computing device 1020 may be activated at the first frequency in FIG. 10A, a user of the computing device 1020 may not know which direction to move to be closer to the stylus 1010. The user may move the computing device 1020 farther away from the stylus 1010 to the point depicted in FIG. 10B. The stylus 1010 can send another signal 1034 to the computing device 1020. The computing device 1020 can determine a second frequency at which haptic actuators in the stylus 1010 and the computing device 1020 should be activated based on a signal strength of the signal 1034. In one example, because the stylus 1010 and the computing device 1020 are farther away from each other in FIG. 10B than they were in FIG. 10A, the second frequency can be lower than the first frequency. The computing device 1020 can modify the activation of its own haptic actuator based on the second frequency and send a signal 1035 to the stylus 1010 with haptic instructions for activating the haptic actuator in the stylus 1010 based on the second frequency.

In FIG. 10C, the stylus 1010 and the computing device 1020 are closer to each other than they were in both of FIG. 10A and FIG. 10B. The stylus 1010 can send another signal 1036 to the computing device 1020. The computing device 1020 can determine a third frequency at which haptic actuators in the stylus 1010 and the computing device 1020 should be activated based on a signal strength of the signal 1036. In one example, because the stylus 1010 and the computing device 1020 are closer to each other in FIG. 10C than they were in both of FIG. 10A and FIG. 10B, the third frequency can be higher than the first and second frequencies. The computing device 1020 can modify the activation of its own haptic actuator based on the third frequency and send a signal 1037 to the stylus 1010 with haptic instructions for activating the haptic actuator in the stylus 1010 based on the third frequency.

The cycle described with respect to FIGS. 10A, 10B and 10C—where the computing device 1020 receives a signal from the stylus 1010, updates the frequency of the haptic actuators, activates its own haptic actuator based on the updated frequency and sends haptic instructions to the stylus 1010 based on the updated frequency—can be repeated multiple times as the user moved the computing device 1020. To the user, the changes in frequency of the haptic action of the computing device 1020 may seem like the frequency is constantly changing as the user moves the computing device 1020. The activation of the haptic actuator in the stylus 1010 may also allow the user to hear the vibrations or other haptic motion of the stylus 1010, especially as the user nears the stylus 1010 with the computing device 1020. Similarly, increasing frequencies of haptic action as the user nears the stylus 1010 with the computing device 1020 may provide more frequent opportunity for the user to hear the haptic action of the stylus. The cycle described with respect to FIGS. 10A, 10B and 10C can also be reversed for the stylus 1010 to be used to find the computing device 1020. The user can input some request in to the stylus 1010, the stylus can send a signal to the computing device 1020, and the computing device 1020 can initiate coordinated haptic action to help the user find the computing device 1020.

Figure 11A:
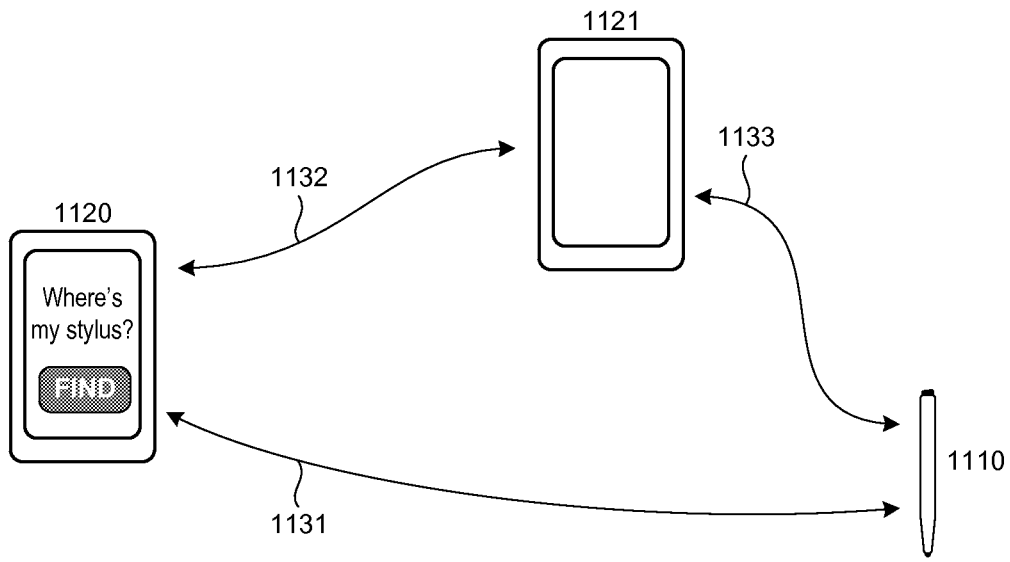
FIGS. 11A and 11B depict an example of how coordinated haptic action between a stylus and a computing device can help locate the stylus when the stylus and the computing device are in wireless communication with a second computing device.
Figure 11B:
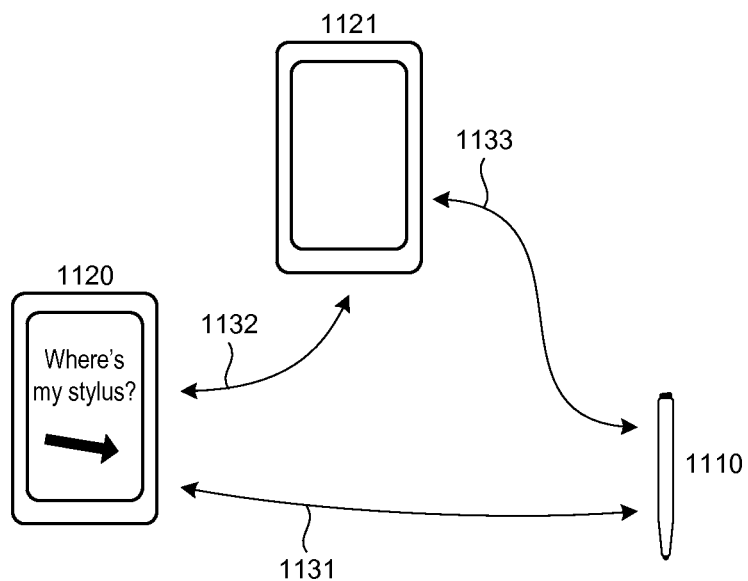

FIGS. 11A and 11B depict an example of how coordinated haptic action between a stylus 1110 and a computing device 1120 can help locate the stylus 1110 when the stylus 1110 and the computing device 1120 are in wireless communication with a second computing device 1121. FIGS. 11A and 11B depict that stylus 1110 and computing device 1120 are in wireless contact via signals 1131, that the computing device 1120 and the second computing device 1121 are in wireless contact via signals 1132 and that the stylus 1110 and the second computing device 1121 are in wireless contact via signals 1133. As shown in FIG. 11A, a user input (e.g., pressing the "FIND" button) can initiate coordinated haptic action to help the user locate the stylus 1110. In response to receiving the user input, the computing device 1120 can communicate wirelessly with the stylus 1110 via signals 1131 to estimate a distance from the computing device 1120 to the stylus 1110. The computing device 1120 can also communicate with the second computing device 1121 via signals 1132 to request that the second computing device 1121 locate the stylus 1110. The two computing devices 1120 and 1121 can be registered with each other or otherwise considered to be "trusted" computing devices. For example, a family may own a number of computing devices, register the computing devices under a single account and/or permit the computing devices to communicate with each other. Upon receiving the request from the computing device 1120, the second computing device 1121 can communicate wirelessly with the stylus 1110 via signals 1133 to estimate a distance from the second computing device 1121 to the stylus 1110. The second computing device 1121 can send the estimated location back to the computing device 1120. The computing device can triangulate an estimated location of the stylus 1110 based on the estimated distance between the computing device 1120 and the stylus 1110 and the estimated distance between the second computing device 1121 and the stylus 1110.

Once the computing device 1120 triangulates the estimated location of the stylus 1110, it can coordinate haptic action of the computing device 1120 and the stylus 1110 in ways similar to those discussed above with respect to FIGS. 10A to 10C. For example, the haptic actuators in the computing device 1120 and the stylus 1110 can be activated at particular frequencies based on the distance between the computing device 1120 and the stylus 1110. In addition, since the computing device 1120 was able to triangulate an estimated location rather than merely a distance, the computing device 1120 may be able to depict a direction toward the stylus 1110, such as the direction indicated by the arrow shown on computing device 1120 in FIG. 11B.

In one embodiment, the user second computing device 1121 can communicate with the computing device 1120 and determine a distance to the stylus 1110 without affecting the use of the second computing device 1121. For example, if the computing device 1120 and the second computing device 1121 are used in the same household by members of a family, one member of the family may be using computing device 1120 to find stylus 1110 while another member of the family may be using an application on the second computing device 1121. The second computing device 1121 could perform the functions described above with respect to the triangulating an estimated location of the stylus 1110 without interrupting or disturbing the use of the application on the second computing device 1121. In another embodiment, the stylus 1110 and the second computing device 1121 could be used to locate the computing device 1120. The user may use the stylus 1110 to request help finding the computing device 1120. The stylus 1110 can send a signal to the computing device 1120, and the computing device 1120 can initiate coordinated haptic action to help the user find the computing device 1120. The second computing device 1121 can display help to the user indicating a direction from the stylus 1110 to the computing device 1120. The computing device 1120 can also initiate coordinated haptic action to help the user of the stylus 1110 to find the computing device 1120.

Figure 12:
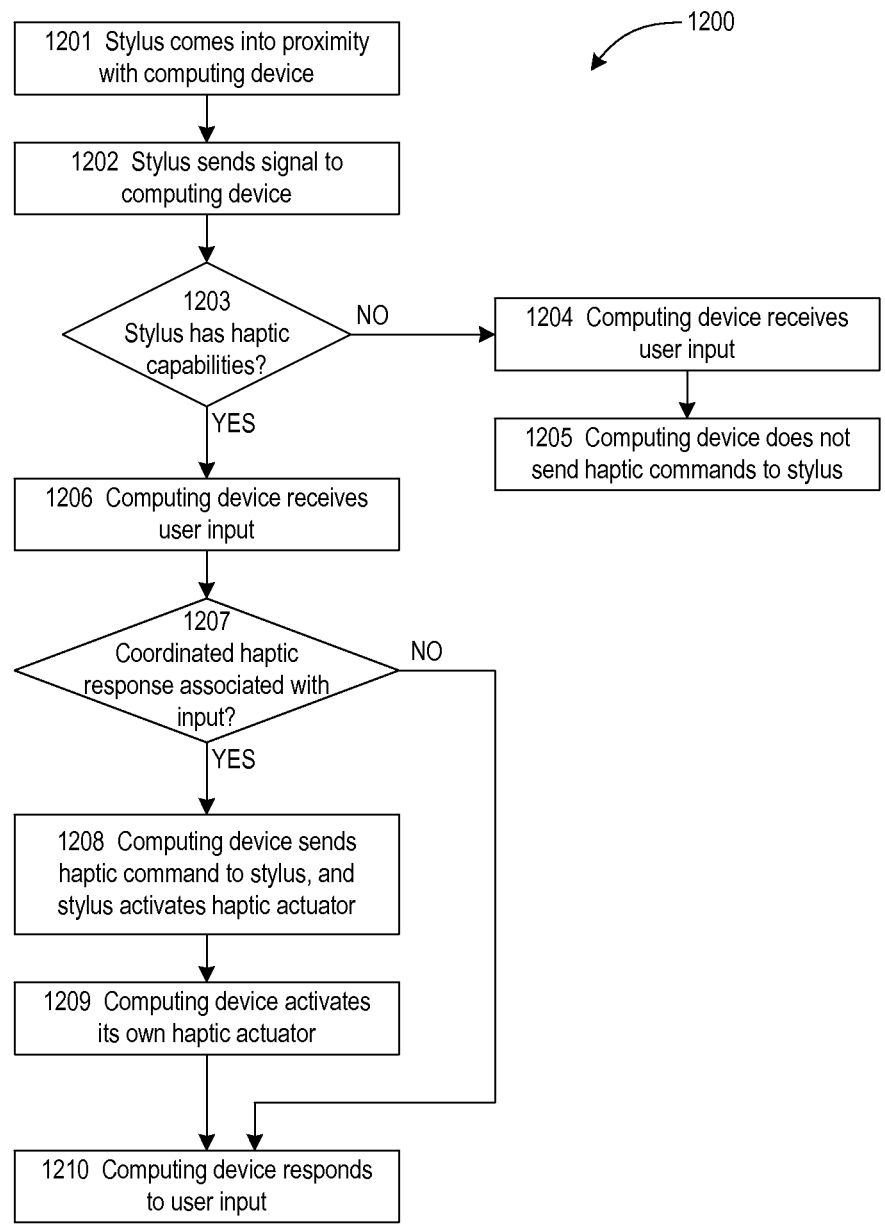
FIG. 12 depicts an example of a method that can be used to respond to a user input with coordinated haptic action between a stylus and a computing device.

FIG. 12 depicts an example of a method 1200 that can be used to respond to a user input with coordinated haptic action between a stylus and a computing device. At block 1201, a stylus can come into proximity with a computing device. The stylus may be considered to be in proximity with the computing device if the stylus is in wireless communication with the computing device. Such wireless communication can be any form of wireless communication, such as Bluetooth, WiFi, NFC, RFID and the like. At block 1202, the stylus can send a signal to the computing device. The signal can include one or more of an identifier of the stylus, an indication of the capabilities of the stylus, an indication of a type of tip or tips on the stylus or any other type of information.

At block 1203, the computing device can make a determination whether the stylus has haptic capabilities. The determination can be made based in part on information in the signal sent from the stylus to the computing device, previous interaction by the computing device with that particular stylus and/or any other type of information. If, at block 1203, it is determined that the stylus does not have haptic capabilities, then, at block 1204, the computing device can continue interacting with the stylus and receive user inputs. At block 1205, the computing device can respond to those user inputs without sending haptic instructions to the stylus. However, if, at block 1203, it is determined that the stylus does have haptic capabilities, then the method can continue to block 1206.

At block 1206, the computing device can receive a user input. Examples of user inputs include movement of the stylus to hover over a selectable element in a user interface, movement of the stylus from hovering over a selectable element to hovering over a location that does not include a selectable element, movement of the stylus across a display of the computing device, pressing a button or other input mechanism on the stylus, pushing a button or other input mechanism on the computing device, movement of the stylus with respect to the computing device, reorienting the stylus with respect to the computing device (e.g., turning the stylus such that one end of the stylus is no longer pointed toward the computing device and another end of the stylus is pointed toward the computing device), interaction with an element in a user interface, reception of a user input via a display of the computing device and the like. Many other examples of user input are possible.

At block 1207, the computing device can determine whether a coordinated haptic response is associated with the user input. A coordinated haptic response for particular user inputs can be defined by an application operating on the computing device, by an operating system operating on the computing device, by settings on the computing device or in any like manner. If, at block 1207, it is determined that a coordinated haptic response has been defined for the user input, then, at block 1208 the computing device can send haptic instructions to the stylus. The haptic instructions can include specific details as to how a haptic actuator on the stylus should respond (e.g., an amount of force, a direction of force, a duration of the response, a frequency of the response, etc.). The haptic instructions can also include a haptic code or haptic identifier that references particular haptic action that is already defined on the stylus. The haptic instructions can also include a set of haptic responses that could be used with subsequent user inputs. In response to receiving the haptic instructions at block 1208, the stylus can activate its haptic actuator based on the haptic instructions received from the computing device. At block 1209, the computing device can activate its own haptic actuator. The combination of the haptic action by the stylus and the haptic action by the computing device can be timed such that the user experiences the haptic actions in a coordinated manner.

After block 1209, the method can proceed to block 1210. Also, if, at block 1207, it is determined that a coordinated haptic response has not been defined for the user input, then the method can proceed to block 1210. At block 1210, the computing device can respond to the user input. Responding to the user input can include performing an action selected by the user input, highlighting a selectable element over which the stylus is now hovering, modifying the behavior of an application (e.g., firing the grenade 633 in the first-person shooter game 630) and the like.

Figure 13:
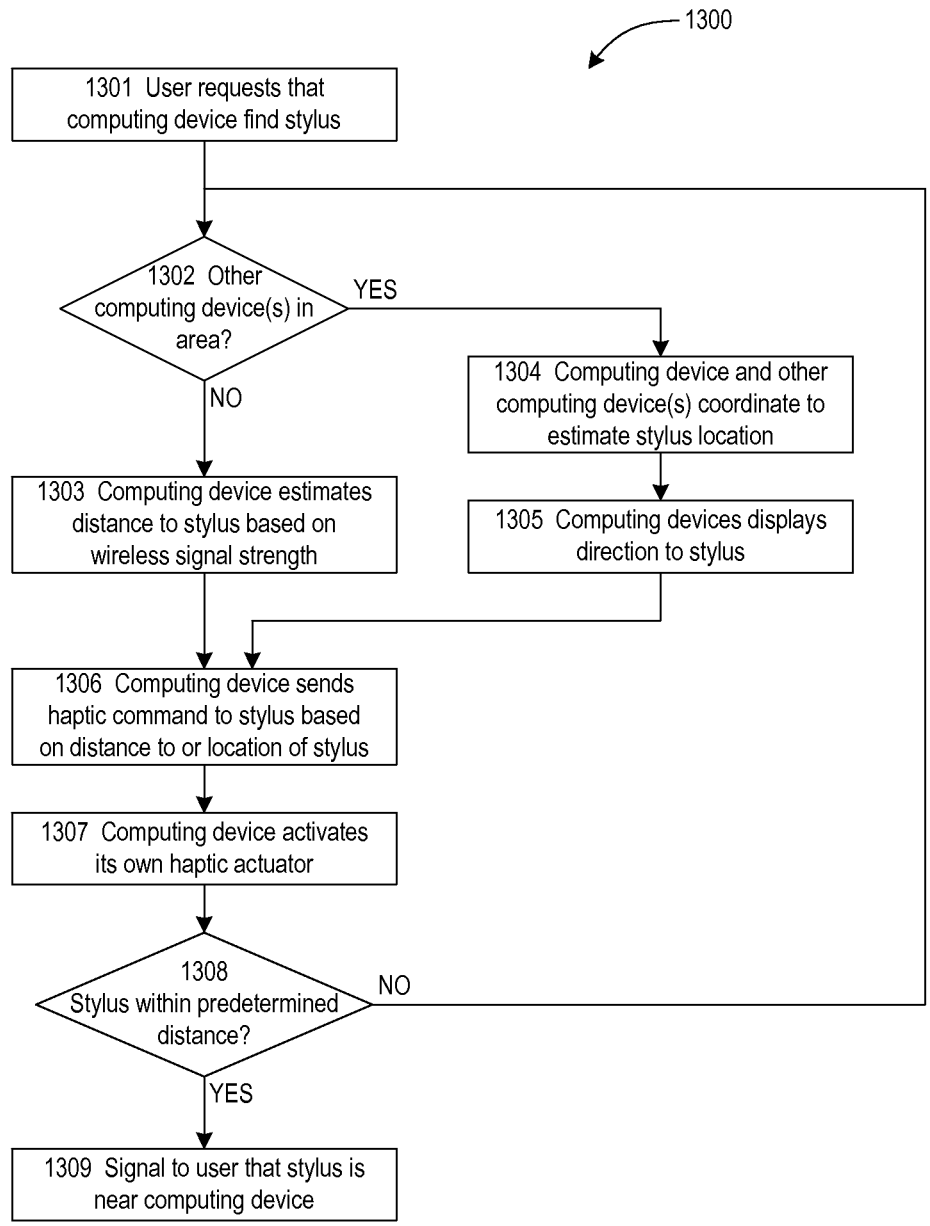
FIG. 13 depicts a method of using coordinated haptic action to find a stylus using one or more computing devices.

FIG. 13 depicts a method 1300 of using coordinated haptic action to find a stylus using one or more computing devices. At block 1301, a computing device can receive a user request to aid in finding a stylus. At block 1302, the computing device can determine whether one or more other computing devices are in the area and available to aid in finding the stylus. The one or more other computing devices may need to be registered or otherwise considered as "trusted" computing devices. The one or more other computing devices may need to be in wireless communication with the computing device. If, at block 1302, the computing device determines that one or more other computing devices are not in the area, then, at block 1303, the computing device can estimate a distance to the stylus based on the strength of a wireless signal between the stylus and the computing device. After block 1303, the method can proceed to block 1306. However, if, at block 1302, the computing device determines that one or more other computing devices are in the area, then, at block 1304, the computing device and the one or more other computing devices in the area can coordinate to estimate a location of the stylus. In one example, each of the computing device and the one or more other computing devices can estimate a distance to the stylus and the computing device can triangulate an estimated location based on the distances determined by each of the computing devices. At block 1305, the computing device can display an indication of a direction to the estimated location of the stylus. After block 1305, the method can proceed to block 1306.

At block 1306, the computing device can sent haptic instructions to the stylus based on either the estimated distance from the computing device to the stylus or the estimated location of the computing device. The haptic instructions can include a frequency of haptic action to be used by the stylus's haptic actuator, and the frequency can be based on the estimated distance from the computing device to the stylus. At block 1307, the computing device can activate its own haptic actuator. The haptic action by the computing device's haptic actuator can be activated according to the same frequency that is based on the estimated distance from the computing device to the stylus.

At block 1308, the computing device can determine whether the stylus is within a predetermined distance of the computing device. The predetermined distance can be a distance where the user should be expected to be able to find the stylus. The predetermined distance can be based on an amount of error that can be expected when the estimating distanced is based on wireless signal strength. For example, if the expected error of measuring distance is ±1 foot, the predetermined distance may be 2 feet. If, at block 1308, the computing device determines that the stylus is not within the predetermined distance, then the method can proceed back to block 1302. From block 1302, the computing device can again determine a new estimated location or distance to the stylus, send new haptic instructions to the stylus based on the new location or distance and adjust the haptic actions performed by its own haptic actuator based on the new location or distance. However, if at block 1308, the computing device determines that the stylus is within the predetermined distance, then, at block 1309, the computing device can signal to the user that the stylus is near the computing device. Such a signal may aid the user to complete the process of locating the stylus.

Figure 14:
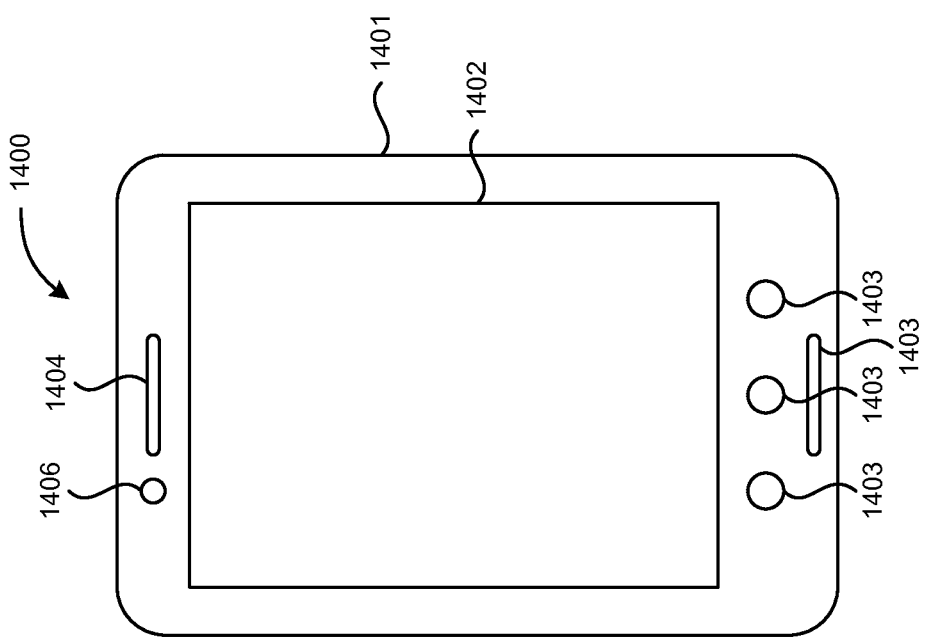
FIG. 14 depicts an embodiment of external components of a computing device.

FIG. 14 depicts an embodiment of external components of a computing device 1400. It should be understood that this is merely an example for discussion, and that a number of additional components, configurations, assemblies and combinations are possible as known in the art. Computing device 1400 can be any form of a computer, such as a desktop computer or laptop computer, a tablet computing device, a cell phone, a handheld computing device, or any other form of computing device. Computing device 1400 can include a housing 1401. The housing 1401 can be made of any material or combinations of materials, such as various types of plastic, metal, glass and combinations thereof, that is suitable to house the components of computing device 1400. Computing device 1400 can also include a display 1402 that can display images, text, any other type of visual information and any combination thereof. Display 1402 can also be a touchscreen display that is capable of sensing the presence and location of one or more touches of the display 1402. A touchscreen display can sense touches by a user, such as a touch by a finger or a hand, and touches by objects, such as by a stylus. Display 1402 can be part of a user interaction system of the computing device 1400.

Computing device 1400 can also include one or more hard buttons 1403 integrated into housing 1401. In one embodiment, the one or more hard buttons 1403 can include a single button, such as a home button or a power button. In another embodiment, the one or more hard buttons 1403 can include a small set of buttons, such as a power button, a home button and a back button. In yet another embodiment, the one or more hard buttons 1403 can include a large set of buttons, such as a full QWERTY keyboard, a keypad and the like. The one or more hard buttons 1403 can be part of the user interaction system of the computing device 1400.

Computing device 1400 can also include a speaker 1404 configured to emit sounds and a microphone 1405 configured to receive sounds. In the embodiment where computing device 1400 is a cell phone, speaker 1404 and microphone 1405 can be used to carry on a telephone call. In one embodiment, speaker 1404 can be configured to play sounds associated with graphics displayed on display 1402, such as during play of audiovisual material on computing device 1400. In another embodiment, microphone 1405 can receive audio sounds, which the computing device 1400 can interpret as user inputs. In addition, while not depicted in FIG. 14, computing device 1400 can also include an audio port, which can be connected to an external microphone and/or an external speaker or speakers. Computing device 1400 can send and receive audio signals via the audio port and interpret the received audio signals via the audio port just as it would interpret audio signals generated from sounds received by the microphone 1405.

Computing device 1400 can also include one or more optical devices 1406. In one embodiment, an optical device can include an optical sensor, such as an infrared sensor, a visible light sensor and/or any device that can sense light and/or electromagnetic energy. The detection of light and/or electromagnetic energy can be used by the computing device 1400 to control components of the computing device 1400, such as a level of light emitted by a backlight of display 1402, illumination of one or more hard buttons 1403 and any other aspect of computing device 1400. In another embodiment, an optical device can include an image-capturing device, such as a digital camera. An image-capturing device can include any device configured to capture an image, such as a complementary metal-oxide-semiconductor (CMOS) active pixel sensor (APS) and a charged coupled device (CCD). Images captured by one or more optical devices 1406 can be stored by the computing device 1400 as individual images or as a series of images in a video. Individual images and/or video images can be processed by computing device 1400 and interpreted as user inputs. While FIG. 14 depicts one of the optical devices 1406 pointing in the same direction as the display 1402, it is possible for computing device 1400 to have any number of optical devices 1406, and it is possible for one or more optical devices 1406 to be pointed in other directions, such as a rear-facing camera pointing in the opposite direction of display 1402.

Figure 15:
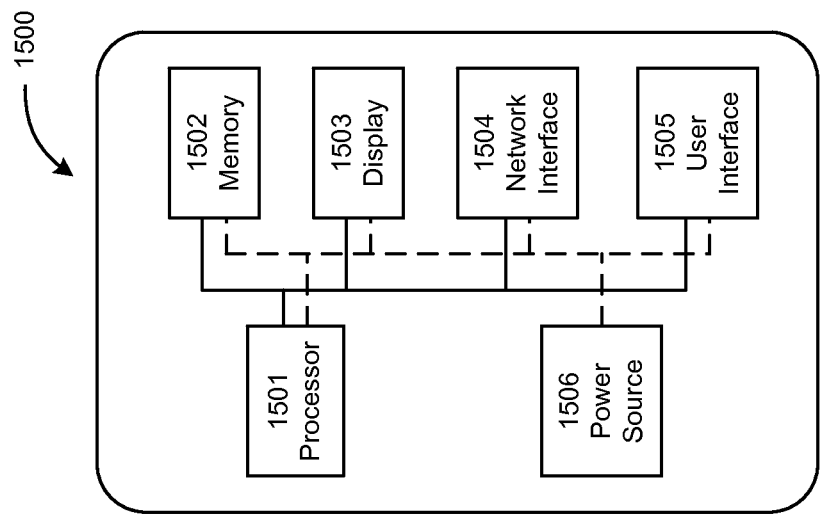
FIG. 15 depicts an embodiment of internal components of a computing device.

FIG. 15 depicts an embodiment of internal components of a computing device 1500. It should be understood that this is merely an example for discussion and that a number of additional components, configurations, assemblies and combinations are possible as known in the art. Computing device 1500 can include at least one processor 1501 that is able to execute instructions stored in one or more memories 1502. The one or more memories 1502 can include instructions for running an operating system, instructions for running one or more applications within the operating system, a system management agent and any other kind of instructions. The at least one processor 1501 can generate information on a display component 1503. Display component 1503 can include one or more of a display driver, a display card, display or any other hardware and/or software required to display an image or series of images. Computing device 1500 can also include a network interface 1504 that allows the device to send and receive information signals via a network. Network interface 1504 can include any type of network adapter for connecting to a network, such as an adapter to establish a connection to the Internet, to a wired or wireless intranet, to a cellular network or to a wireless network. Computing device 1500 can also include a user interface 1505. User interface 1505 can include one or more components, such as display 1402, one or more hard buttons 1403, speaker 1404, microphone 1405 and optical devices 1406, that can provide information to a user and/or receive inputs from a user. User interface 1505 can also include one or more external components, such as an external keyboard, external mouse, external microphone, external speaker and the like.

Computing device 1500 can include a power source 1506. Power source 1506 can provide power to any or all of the other components in computing device 1500. As depicted in FIG. 15, power source 1506 can be connected to, and provide power to, each of processor 1501, memory 1502, display 1503, network interface 1504 and user interface 1505. Power source can be any type of power source, such as one or more disposable batteries, a rechargeable battery and the like. In the embodiment where computing device 1500 is a portable device, such as a laptop computer, a tablet computer, a cell phone, a hand held computer and the like, the power source 1506 may need to provide power for a period of time between recharging of the power source 1506. When power source 1506 is not connected to an external power source, computing device 1500 is drawing on the power stored in power source 1506. The capacity of power source 1506 can vary with the type and size of power source 1506. The rate at which power source 1506 discharges depends on a number of factors, such as which components of computing device 1500 are active, how much power each of the active components are drawing from power source 1506 and the like.

Figure 16:
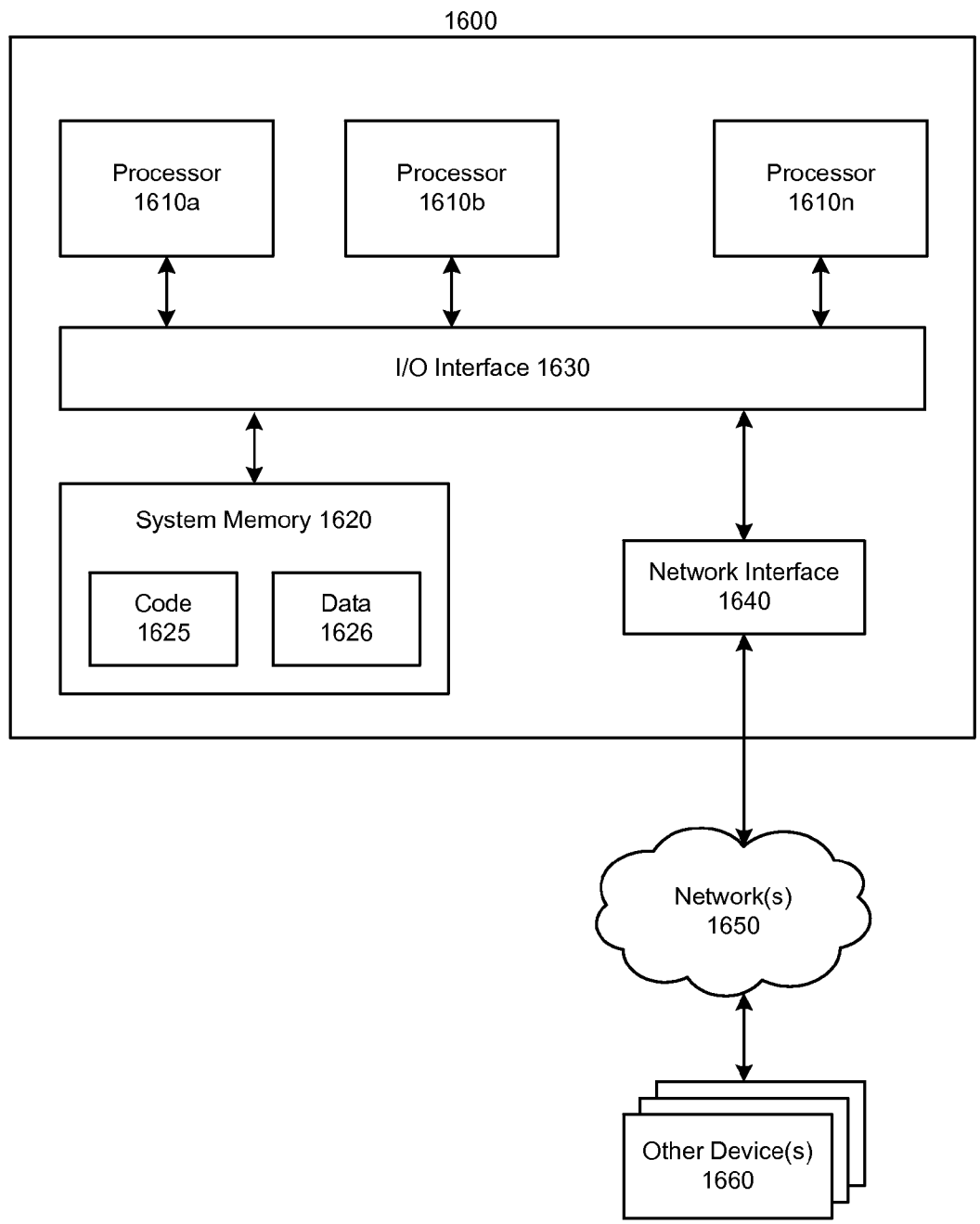
FIG. 16 depicts a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 16 depicts a general-purpose computer system that includes or is configured to access one or more computer-accessible media. In the illustrated embodiment, computing device 1600 includes one or more processors 1610a, 1610b and/or 1610n (which may be referred herein singularly as "a processor 1610" or in the plural as "the processors 1610") coupled to a system memory 1620 via an input/output (I/O) interface 1630. Computing device 1600 further includes a network interface 1640 coupled to I/O interface 1630.

In various embodiments, computing device 1600 may be a uniprocessor system including one processor 1610 or a multiprocessor system including several processors 1610 (e.g., two, four, eight or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC or MIPS ISAs or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1620 as code 1625 and data 1626.

In one embodiment, I/O interface 1630 may be configured to coordinate I/O traffic between processor 1610, system memory 1620 and any peripherals in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computing device 1600 and other device or devices 1660 attached to a network or networks 1650, such as other computer systems or devices, for example. In various embodiments, network interface 1640 may support communication via any suitable wired or wireless general data networks, such as types of Ethernet networks, for example. Additionally, network interface 1640 may support communication via telecommunications/telephony networks, such as analog voice networks or digital fiber communications networks, via storage area networks, such as Fibre Channel SANs (storage area networks) or via any other suitable type of network and/or protocol.

In some embodiments, system memory 1620 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1600 via I/O interface 1630. A non-transitory computer-accessible storage medium may also include any volatile or non-volatile media, such as RAM (e.g. SDRAM, DDR SDRAM, RDRAM, SRAM, etc.), ROM etc., that may be included in some embodiments of computing device 1600 as system memory 1620 or another type of memory. Further, a computer-accessible medium may include transmission media or signals, such as electrical, electromagnetic or digital signals, conveyed via a communication medium, such as a network and/or a wireless link, such as those that may be implemented via network interface 1640. Portions or all of multiple computing devices, such as those illustrated in FIG. 16, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization to provide one or more web services (such as various types of cloud-based computing or storage), accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing device comprising:
   a first haptic actuator;
   at least one processor; and
   one or more memories comprising instructions that, when executed by the at least one processor, at least cause the computing device to:
   receive a signal from a stylus, the stylus comprising a second haptic actuator,
   determine, based at least in part on information received in the signal, that the stylus has haptic capabilities,
   receive a user input from the stylus,
   determine a coordinated haptic response based at least in part on the user input, wherein the coordinated response coordinates a haptic response in at least the stylus and the computing device,
   send haptic instructions to the stylus based at least in part on the coordinated haptic response, wherein the stylus is configured to activate the second haptic actuator in accordance with the haptic instructions sent by the computing device, and activate the first haptic actuator based at least in part on the coordinated haptic response.

2. The computing device of claim 1, further comprising: a touchscreen display;
wherein the user input from the stylus comprises an end of the stylus moving to a position hovering over a selectable element displayed on the touchscreen display or an end of the stylus moving away from a position hovering over a selectable element displayed on the touchscreen display.

3. The computing device of claim 1, wherein the haptic instructions comprise at least one of a start time for activation of the second haptic actuator, a duration after activation of the second haptic actuator, a direction of force for the second haptic actuator, an amount of force for the second haptic actuator, or a frequency of activation of the second haptic actuator.

4. The computing device of claim 1, wherein the haptic instructions comprise a code or an identifier of a particular haptic action stored on the stylus.

5. The computing device of claim 1, wherein the haptic instructions are defined by an application operating on the computing device.

6. A method comprising:
receiving, by a computing device from a stylus, an indication of the stylus, the computing device comprising a first haptic actuator and the stylus comprising a second haptic actuator;
determining, by the computing device, that coordinated haptic action is associated with a user input, wherein the coordinated response coordinates a haptic response in at least the stylus and the computing device;
sending, by the computing device to the stylus, haptic instructions based at least in part on the coordinated haptic action, wherein the stylus is configured to activate the second haptic actuator in response to receiving the haptic instruction; and
activating, by the computing device, the first haptic actuator based at least in part on the coordinated haptic action.

7. The method of claim 6, wherein the haptic instructions are configured to cause the stylus to activate the second haptic actuator approximately synchronously with the activation of the first haptic actuator by the computing device.

8. The method of claim 6, wherein the haptic instructions are configured to cause the stylus to activate the second haptic actuator asynchronously with the activation of the first haptic actuator by the computing device.

9. The method of claim 6, further comprising:
determining, by the computing device, an orientation of the stylus with respect to the computing device.

10. The method of claim 9, wherein determining the orientation of the stylus comprises determining an angle of the stylus with respect to the computing device.

11. The method of claim 10, wherein the haptic instructions are further based at least in part on the angle of the stylus with respect to the computing device.

12. The method of claim 6, further comprising:
determining, by the computing device, a particular virtual medium associated with the computing device and a particular virtual implement associated with the stylus.

13. The method of claim 12, wherein the haptic instructions are further based at least in part on one or more of the particular virtual medium or the particular virtual implement, and wherein activating the first haptic actuator is further based at least in part on one or more of the particular virtual medium or the particular virtual implement.

14. The method of claim 6, wherein activating the first haptic actuator causes the computing device to move in a first particular direction, and wherein the haptic instructions comprise instructions for the second haptic actuator to move the stylus in a second particular direction.

15. The method of claim 6, further comprising:
receiving, by the computing device from a second stylus, an indication of the second stylus, the second stylus comprising a third haptic actuator.

16. The method of claim 15, further comprising:
sending, by the computing device to the second stylus, additional haptic instructions based at least in part on the coordinated haptic action, wherein the second stylus is configured to activate the third haptic actuator in response to receiving the additional haptic instructions.

17. A non-transitory computer-readable medium having embodied thereon computer-readable instructions, the computer-readable instructions comprising instructions that, when executed by a computing device, at least cause:
receiving, by the computing device, a user input comprising a request to find a stylus;
sending, from the computing device to the stylus, a first signal;
receiving, by the computing device from the stylus, a second signal, wherein the stylus is configured to send the second signal in response to receiving the first signal;
estimating, by the computing device, a distance from the computing device to the stylus based at least in part on a signal strength of the second signal;
sending, by the computing device, haptic instructions to the stylus based at least in part on the estimated distance from the computing device to the stylus, wherein the stylus is configured to activate a haptic actuator of the stylus in accordance with the haptic instructions; and
activating, by the computing device, a haptic actuator of the computing device at a first frequency based at least in part on the estimated distance from the computing device to the stylus.

18. The non-transitory computer-readable medium of claim 17, the computer-readable instructions further comprising instructions that, when executed by the computing device, at least cause:
estimating, by the computing device, an updated distance from the computing device to the stylus based at least in part on a signal strength of a third signal sent from the stylus to the computing device; and
activating, by the computing device, the haptic actuator of the computing device at a second frequency based at least in part on the estimated updated distance from the computing device to the stylus.

19. The non-transitory computer-readable medium of claim 18, wherein the estimated distance is greater than the estimated updated distance and wherein the second frequency is greater than the first frequency.

20. The non-transitory computer-readable medium of claim 18, wherein the estimated updated distance is greater than the estimated distance and wherein the first frequency is greater than the second frequency.

21. The non-transitory computer-readable medium of claim 17, the computer-readable instructions further comprising instructions that, when executed by the computing device, at least cause:
receiving, by the computing device from a second computing device, an indication of an estimated distance from the second computing device to the stylus; and
triangulating, by the computing device, an estimated location of the stylus based at least in part on the estimated distance from the computing device to the stylus and the estimated distance from the second computing device to the stylus.

22. The non-transitory computer-readable medium of claim 21, wherein the first frequency is further based at least in part on the estimated location of the stylus.

23. The non-transitory computer-readable medium of claim 21, the computer-readable instructions further comprising instructions that, when executed by the computing device, at least cause:
   displaying, by the computing device, an indication of a direction from the computing device to the estimated location of the stylus.

\* \* \* \* \*